US008724675B2

(12) United States Patent  (10) Patent No.: US 8,724,675 B2
Jarvis et al.  (45) Date of Patent: May 13, 2014

(54) COHERENT INTERFERENCE DETECTION

(75) Inventors: Murray Robert Jarvis, Stapleford (GB); Gary Lennen, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 76 days.

(21) Appl. No.: 13/366,590

(22) Filed: Feb. 6, 2012

(65) Prior Publication Data

US 2013/0034123 A1  Feb. 7, 2013

(30) Foreign Application Priority Data

Feb. 4, 2011 (GB) .................................. 1101963.5

(51) Int. Cl.
*H04B 1/00* (2006.01)
(52) U.S. Cl.
USPC ......................................... 375/142; 370/212
(58) Field of Classification Search
USPC ........... 375/141, 142, 343; 342/357, 464, 451
See application file for complete search history.

(56) References Cited

U.S. PATENT DOCUMENTS

| | | | | |
|---|---|---|---|---|
| 5,151,919 A | * | 9/1992 | Dent | 370/209 |
| 6,430,212 B1 | * | 8/2002 | Alisobhani et al. | 375/141 |
| 6,466,566 B1 | * | 10/2002 | De Gaudenzi et al. | 370/342 |
| 7,106,251 B2 | * | 9/2006 | Schmid et al. | 342/464 |
| 7,209,076 B2 | * | 4/2007 | Roh | 342/357.59 |
| 7,224,716 B2 | * | 5/2007 | Roman | 342/357.59 |
| 7,248,218 B2 | * | 7/2007 | Schmid et al. | 342/451 |
| 7,321,645 B2 | * | 1/2008 | Lee et al. | 375/240.12 |
| 7,991,044 B1 | * | 8/2011 | Brown et al. | 375/343 |
| 8,385,187 B2 | * | 2/2013 | Flury et al. | 375/226 |
| 2004/0076222 A1 | * | 4/2004 | De Francesco et al. | 375/141 |
| 2004/0196183 A1 | * | 10/2004 | Roh | 342/357.12 |
| 2007/0274386 A1 | * | 11/2007 | Rhoads | 375/142 |

FOREIGN PATENT DOCUMENTS

| | | | |
|---|---|---|---|
| EP | 1 916 535 A1 | 4/2008 | |
| GB | 2 400 282 A | 10/2004 | |
| GB | 2400282 A | * 10/2004 | ............. H04B 1/707 |

OTHER PUBLICATIONS

UK Search Report dated Jun. 7, 2012, in corresponding GB application GB1101963.5.

* cited by examiner

*Primary Examiner* — Daniel Washburn
*Assistant Examiner* — Berhanu Tadese
(74) *Attorney, Agent, or Firm* — RatnerPrestia

(57) ABSTRACT

A method for detecting coherent interference includes the steps of: (a) receiving a signal at a first frequency, (b) forming a set of cross-correlation results by at least cross-correlating the signal with a first known code for a plurality of code offsets, (c) determining a statistical signature of the cross-correlation results, and (d) deciding, based on the statistical signature, whether non-negligible coherent interference is present within a search bin defined by the combination of the first frequency and the first known code.

23 Claims, 23 Drawing Sheets

| Phase τ | Integration run no. / Sample no. | 1 | 2 | ... | m | ... | M-1 | M |
|---|---|---|---|---|---|---|---|---|
| Δτ | 1 | $S_{1,1}$ | $S_{1,1}+S_{2,1}$ | ... | $\sum_m S_{m,1}$ | ... | $\sum_{m=1}^{m=M-1} S_{m,1}$ | $\sum_{m=1}^{m=M} S_{m,1} = S_1$ |
| 2Δτ | 2 | $S_{1,2}$ | $S_{1,2}+S_{2,2}$ | ... | $\sum_m S_{m,2}$ | ... | $\sum_{m=1}^{m=M-1} S_{m,2}$ | $\sum_{m=1}^{m=M} S_{m,2} = S_2$ |
| ... | ... | ... | ... | ⋮ | ... | ... | ... | ... |
| nΔτ | n | $S_{1,n}$ | $S_{1,n}+S_{2,n}$ | ... | $\sum_m S_{m,n}$ | ... | $\sum_{m=1}^{m=M-1} S_{m,n}$ | $\sum_{m=1}^{m=M} S_{m,n} = S_n$ |
| ... | ... | ... | ... | ⋮ | ... | ... | ... | ... |
| (N-1)Δτ | N-1 | $S_{1,(N-1)}$ | $S_{1,(N-1)}+S_{2,(N-1)}$ | ... | $\sum_m S_{m,(N-1)}$ | ... | $\sum_{m=1}^{m=M-1} S_{m,(N-1)}$ | $\sum_{m=1}^{m=M} S_{m,(N-1)} = S_{N-1}$ |
| NΔτ=T | N | $S_{1,N}$ | $S_{1,N}+S_{2,N}$ | ... | $\sum_m S_{m,N}$ | ... | $\sum_{m=1}^{m=M-1} S_{m,N}$ | $\sum_{m=1}^{m=M} S_{m,N} = S_N$ |
| | $\sum$ | $N\mu_1$ | $N\mu_1+N\mu_2$ | ... | $N\sum_m \mu_m$ | ... | $N\sum_{m=1}^{m=M-1} \mu_m$ | $N\sum_{m=1}^{m=M} \mu_m = Y = N\mu$ |

Figure 2

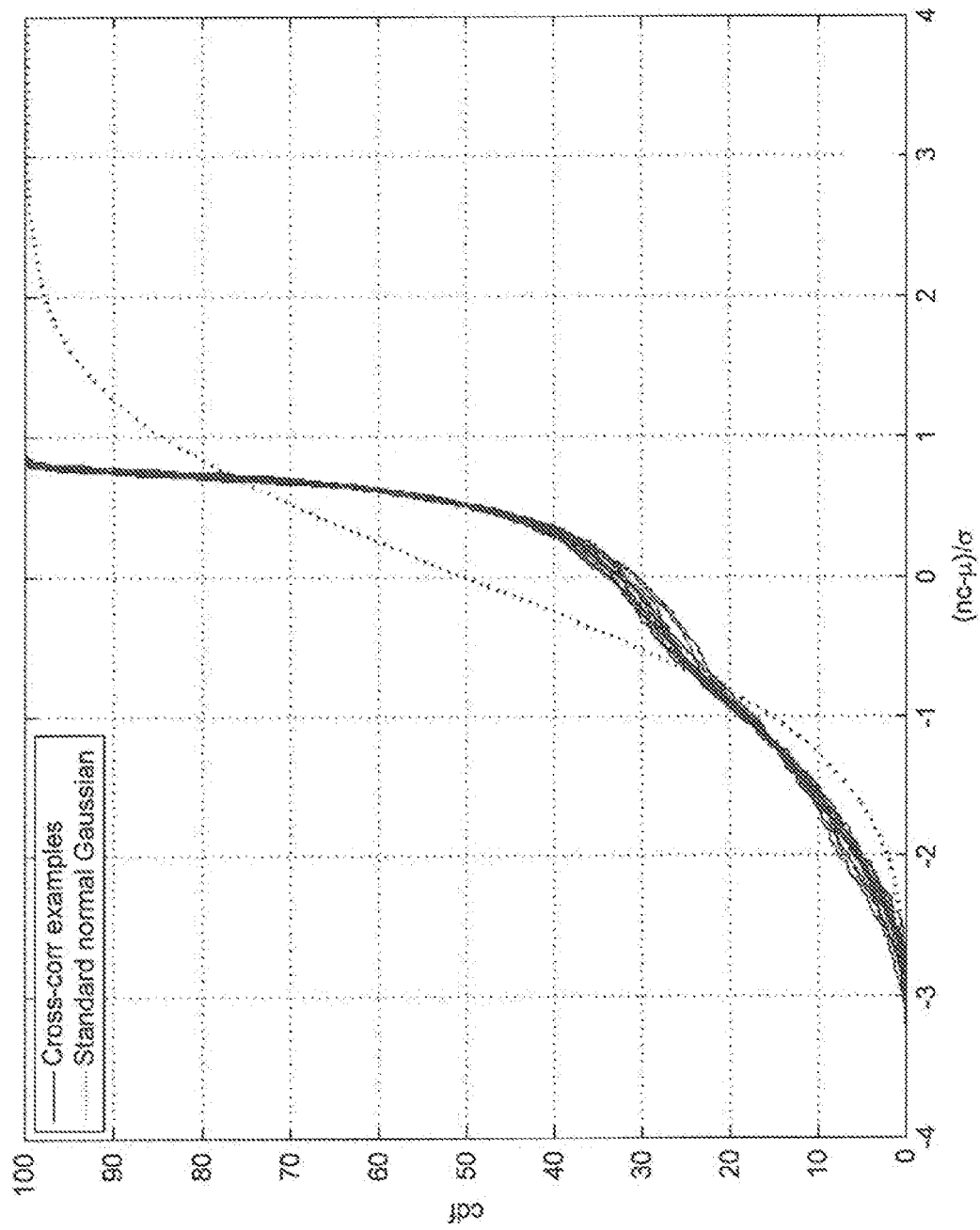

COHERENT INTERFERENCE DETECTION

BACKGROUND OF THE INVENTION

The present invention relates to a method and system for detecting interference.

Interference is a problem in many wireless signalling systems. Examples include Global Navigation Satellite Systems (GNSS). GNSS use satellites for geo-spatial positioning with global coverage. The best known example of these systems is the Global Positioning System, or GPS. Using these systems small electronic receivers are able to determine their location (longitude, latitude, and altitude) to within a few meters using the travel times of signals transmitted along a line-of-sight by radio from multiple satellites.

GPS signals are formed of a navigation message binary phase shift modulated (BPSK) onto a direct sequence spread spectrum (DSSS) signal. The spread spectrum signal comprises a unique pseudo-noise (PN) code that identifies the satellite. For civil application GPS signals transmitted using the L1 carrier frequency, this code is known as the C/A code. The C/A code is a member of a Gold code family. Other code families are in use for other global navigation satellite systems. The C/A code has a sequence length of 1023 chips and it is spread with a 1.023 MHz chipping rate. The code sequence therefore repeats every millisecond. The code sequence has an identified start instant when the two code generators in the satellite just transition to the all state. This instant is known as the code epoch. After various transport delays in the satellite, the code epoch is broadcast through the timing and sequence of specific code states assigned to the satellite. This signalling event can be recognised, in suitably adapted receivers, through a process of aligning a replica code with the code received from each satellite.

The navigation message has a data rate of 50 bits per second, lower than the code rate, and its data bit or symbol transitions are synchronised with the start of the C/A code sequence. Each bit of the navigation message lasts for 20 milliseconds and thus incorporates 20 repetitions of the CIA code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

As mentioned above, a GPS receiver may determine the time-of-arrival of a signalling event through a process of aligning a replica code with the code received from each satellite. The receiver may also use TOW (time of week) information contained in the navigation message to determine the time when the signalling event was transmitted. From this, the receiver can determine the transit time for the signalling event (from which it can determine the distance between it and the satellite), together with the position of the satellite at the time when the signalling event was transmitted (using ephemeris information sent with the navigation signal). The receiver can then calculate its own position. Theoretically, the position of the GPS receiver can be determined using signals from three satellites, providing the receiver has a precise time reference or knowledge of part of the positions, such as altitude. However, in practice GPS receivers use signals from four or more satellites to determine an accurate three-dimensional location solution because an offset between the receiver clock and GPS time introduces an additional unknown into the calculation.

The first stage of processing during which the visible signals are identified is known as signal acquisition. To find the signals from any satellites that may be in view the receiver may search over a range of possible time and frequency offsets. Although GPS is a spread spectrum system and therefore all the satellites broadcast the C/A code on nominally the same frequency, a frequency search is still required if there is any uncertainty in the frequency of the receiver's local clock or if there is any uncertainty in the receiver's knowledge of the relative motion of the receiver and the satellites. In order to find one particular satellite with a PN known to the receiver, the receiver must compare the signal it receives to the expected signal, usually using a cross-correlation method. If the receivers time uncertainty exceeds the code duration then the code transmission can be at any point in its cycle, and the receiver must search over all possible code phases. In this specification a search for a particular PN at a particular frequency over all potential code phases is referred to as a search spanning a particular search bin.

These signal searches can mistakenly identify spurious signals caused by coherent interferers. These may be due to cross-correlation from other satellites of the same constellation, augmentation satellites, other constellations of satellites, narrowband interferers or local jammers, amongst others. Such spurious signals can result in process resources at the receiver being overwhelmed and invalid signals being identified. Interferers are commonly PN- and frequency-specific but tend to impact many code phases within a search bin.

In a system of the type described above, coherent interferers have waveforms that include repetitive characteristics, the periodicity related to the CA code repeat period. In the presence of a coherent interferer the matched filter results for a particular code phase may have a bias that can persist for a period of time. This period of time depends on the rate at which the interfering waveform drifts with respect to the matched filter code phases. The coherent interferer-induced bias creates a problem for GPS receivers because it accumulates in exactly the same way as a real GPS signal. Thus even a small coherent interferer may look to the detection logic like a real signal or it may obscure the real signal.

The conventional approach to eliminating coherent interferers is to detect strong satellites first and measure their signal strengths and frequencies. A look-up table is then used to determine if a weaker candidate satellite signal could be a further cross-correlation from one of the strong satellites. More advanced systems also consider the possibility that the weak signal is due to interference from a combination of strong satellites. Additionally the interference depends on other factors that may or may not be known such as the coarse alignment of the receiver's local clock. These factors may be individually taken into account, or a correction factor corresponding to the overall worst case scenario could be applied.

An alternative technique is to determine the correct code phase alignment for each of the satellites from which strong signals are being received and the magnitude of the received signals. The cross-correlation values of these strong satellite signals with all the weaker ones still subject to search can then be determined. A process of subtraction may then be employed to remove the effects of the cross-correlation from all the strong satellite signals from the channels used to search for the weaker satellite signals. This process can significantly improve the detection sensitivity for the weaker satellite signals. However, it should be noted that this technique only works well when the relative distances to each satellite are known to within ½ chip, otherwise the cross-correlation subtraction does not take place in the correct respective search bin.

These existing methods require detailed knowledge of parameters relating to the potential interferers including their identity, signal structure and signal strength. This parametric information is then used to work out the expected interference and discard signals from search bins which are identified as potentially compromised. Therefore all possible interferers should be known and continuously monitored. This approach does not scale well in the presence of more than one interferer and therefore, as more GNSS systems are deployed, this is an increasingly demanding task. The emerging multiplicity of GNSS signal sources, especially in the L1 band, will undoubtedly increase the global interference suffered by GNSS receivers at least due to the cross-correlation effects between the various code families used. There is clearly practical difficulty in obtaining and maintaining a list of all potential interferers. Additionally, complications arise when multiple coherent interferers are present. A general mechanism for coherent interference rejection would be preferred over this parametric mechanism so that a receiver could be resilient to any present or future coherent interferer. What is needed is a signal acquisition method, implementable on relatively simple hardware, which can eliminate coherent interference signals from signal acquisition without detailed parametric knowledge of interferers.

SUMMARY OF THE INVENTION

According to a first aspect of the invention, there is provided a method for detecting coherent interference, the method comprising the steps of: (a) receiving a signal at a first frequency, (b) forming a set of cross-correlation results by at least cross-correlating the signal with a first known code for a plurality of code offsets, (c) determining a first statistical signature of the cross-correlation results, and (d) deciding, based on the first statistical signature, whether non-negligible coherent interference is present within a first search bin defined by the combination of the first frequency and the first known code.

The said step (b) of forming the set of cross-correlation results may comprise at least: (b.i) cross-correlating the signal with a first known code for a plurality of code offsets, and (b.ii) either (b.ii.1) determining the absolute values of the values output by the said step (b.i), or (b.ii.2) determining the squares of the values output by the said step (b.i).

The said step (b) of forming the set of cross-correlation results may further comprise at least: (b.iii) non-coherently summing all the values determined in the said step (b.ii) each time a new value is determined in the said step (b.ii).

The first known code may be a pseudorandom code.

The first statistical signature may indicate the extent to which peak values among the cross-correlation results are clustered about plural code offsets.

The method may comprise the step of: comparing the values determined in the said step (b.ii.1) to a threshold value, and determining any code offsets having cross-correlation results higher than that threshold value to be candidates for future receiving operations.

The method may comprise the step of calculating the threshold value as the mean of the values determined in the said step (b.ii.1) plus a multiple of their standard deviation.

The method may comprise re-calculating the threshold value from time to time.

The method may comprise assessing whether the number of candidates exceeds a predetermined value, and if it does determining there to be non-negligible coherent interference present in the first search bin.

The said step (d) may comprise comparing the first statistical signature with a first expected statistical signature.

The first expected statistical signature may be the statistical signature expected in the absence of non-negligible coherent interference.

The first expected statistical signature may be that of additive white Gaussian noise.

The coherent interference may be continuous wave interference and the first expected statistical signature may be that of a noise channel.

The said step (d) may comprise treating the received signal as having a constant variance.

The method may comprise assessing whether the first expected and measured statistical signatures deviate by less than a first predetermined amount and if they do then determining that there is negligible coherent interference in the first search bin.

The method may comprise assessing whether the first expected and measured statistical signatures deviate by more than a second predetermined amount and if they do then determining that there is non-negligible coherent interference present in the first search bin.

The method may comprise assessing whether the first expected and measured statistical signatures deviate by an amount between said first and second predetermined amounts, and if they do then in the said step (d) repeating the previous steps with an increased threshold value.

The method may comprise re-calculating the first and/or second amounts from time to time.

The first statistical signature may be the standard deviation of the cross-correlation results.

The method may be performed for a plurality of search bins.

The known code may be a code transmitted by a particular remote transmitter.

The method may be performed as part of a signal acquisition process.

The received signal may originate from a satellite.

The method may further comprise the steps of: if the said step (d) resulted in a decision that coherent interference was present within the first search bin then (e.i) repeating the previous steps for a second search bin, different to the first search bin; or if the said step (d) resulted in a decision that coherent interference was not present within the first search bin then (e.ii) determining a second statistical signature of the cross-correlation results, and deciding, based on the second statistical signature, whether non-negligible coherent interference is present within the first search bin.

According to a second aspect of the invention, there is provided a system for detecting coherent interference, the system comprising: a signal receiver for receiving a signal at a first frequency, a cross-correlator for forming a set of cross-correlation results by at least cross-correlating the received signal with a first known code for a plurality of code offsets, a processor for determining a first statistical signature of the cross-correlation results, and a decision unit for deciding whether non-negligible coherent interference is present within a first search bin defined by the combination of the particular frequency and the first known code based on the statistical signature.

BRIEF DESCRIPTION OF THE DRAWINGS

Aspects of the present invention will now be described by way of example with reference to the accompanying drawings. In the drawings:

FIG. 2 shows the table of values built up by the NCS integrator;

FIG. 3b plots κ over the course of acquisition for the AGC profiles of FIG. 3a;

FIGS. 5a-1, 5a-2, 5b and 5c show example cross-correlation data compared to Gaussian data;

DETAILED DESCRIPTION OF THE INVENTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
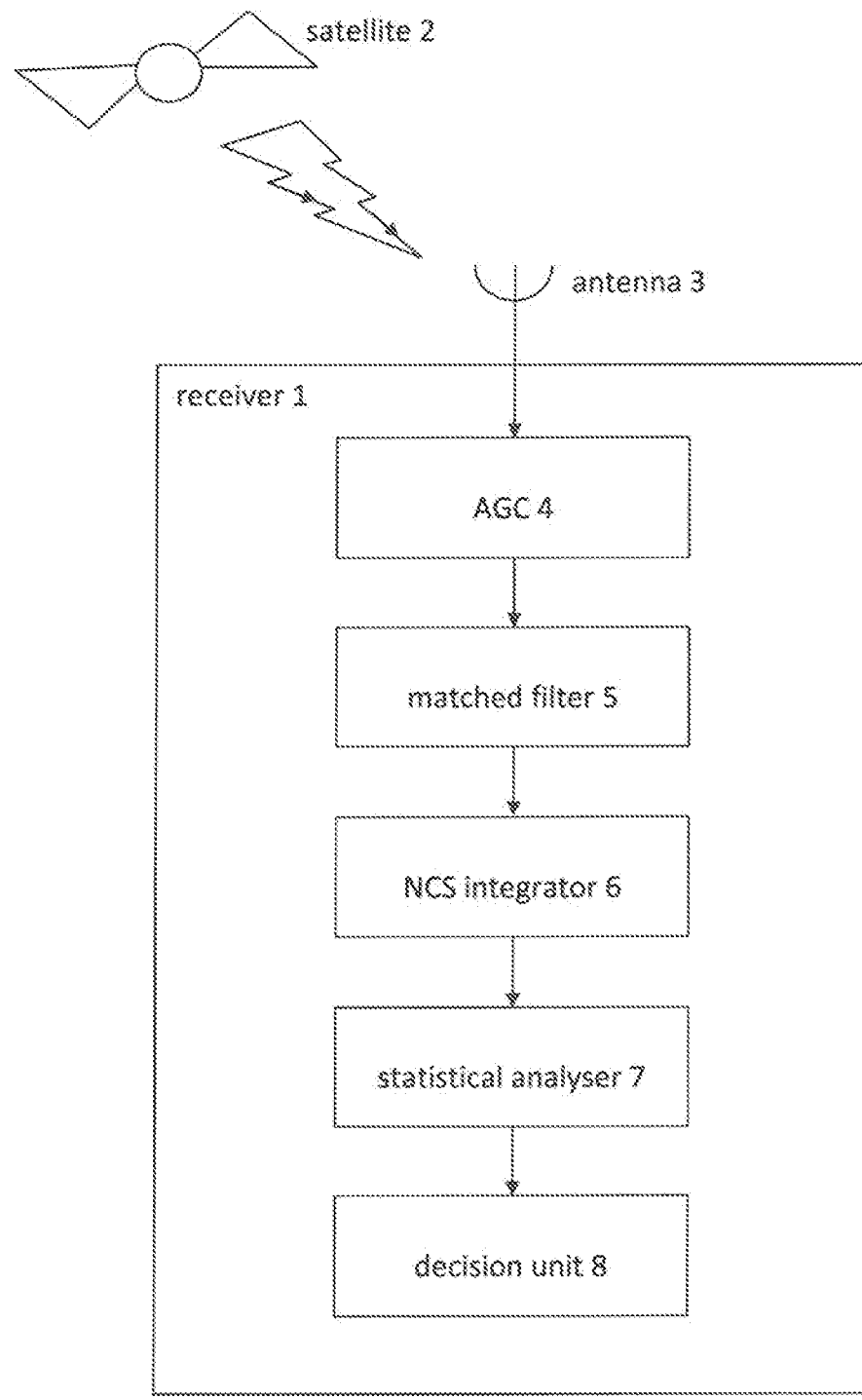
FIG. 1 is a schematic of an example system.

FIG. 1 is a schematic of an example system which may use the method of the forthcoming disclosure. A receiver 1 may be a radio receiver intended to pick up signals from satellites such as a satellite 2. The receiver 1 may be housed in a positioning device which uses ranging signals received from several satellites to estimate its own position. In order to receive and interpret the ranging signals it must be able to lock-on to each satellite's transmitted signal.

In operation, the satellite 2 may transmit a specific PN code on a specific frequency. This PN code is repeated cyclically every millisecond but is BPSK by data every 20 ms as described previously. The receiver 1 may be trying to lock-on to the satellite 2 and may know the satellite 2's particular PN code and the frequency on which it is transmitted, but not the phase of the PN code signal with respect to the receiver 1's local clock.

An antenna 3 may receive a radio signal. The signal received may be mixed down to baseband where it forms a stream of complex IQ data. The amplitude of this raw data may be controlled by an autogain control (AGC) section 4. The amplified IQ data may then be correlated against a matched filter 5 which compares the received signal with the known PN code used by the satellite 2.

If f(t) is the time-varying stream of IQ data output by the AGC section 4, and g(t) is the receiver's stored replica of the PN code signal for the satellite 2 appropriately phased for the frequency bin under consideration then the matched filter 5 may perform the following correlation:

$$f(t)^* g(t) = \int_0^T f^*(t) \cdot g(t-\tau) \, dt = h(\tau) \quad (1)$$

where T is the period of the regularly repeating PN code signal and the correlation is performed from time t=0 to time t=T. τ is the code phase used for a particular correlation sample and its value varies from zero to T. N samples may be taken. In practice this integral is approximated by a discrete summation and, for the C/A codes used in GPS, typical numbers of samples per millisecond code cycle period are N=1536, N=2048 and N=4096.

The summation approximating the integral of equation (1) may take place in "real time", that is the integration variable t is increased at the same rate as the real timeline so that IQ data is processed at the same rate at which it is received, with a short delay. Processing may also be done faster or slower than "real time" by caching the IQ data as it comes in and processing it later. For example, in a hardware receiver the processing may be faster than "real time" so that multiple search bins may be checked while one section of data is received. In that case the summation may be performed such that advancing one unit of t may be equivalent to advancing a tiny fraction of that unit on the IQ data reception timeline. Conversely, in a software receiver the processing may be slower than "real time" as the data is stored and read as needed.

The "real time" example will now be used for ease of explanation, although this will not usually be the most appropriate approach for real-life situations. A new integration (summation) is started to produce a new sample value h(τ) once every T/N seconds for T seconds so that at time t=2T the search bin will be fully populated with a set of N samples each corresponding to N different code phases with consecutive code phases separated by Δτ=T/N.

Due to the periodic nature of the C/A code it is convenient to coherently integrate for an integer multiple of the code period, T, as the cross correlation can be performed by accumulating data from consecutive periods prior to correlation against the matched filter. If the receiver is tuned to exactly the same frequency as that on which the satellite transmits then the longer the coherent integration time the more accurate the results, since the effects of random noise will cancel out over time. However in reality the frequencies of the satellite and receiver are unlikely to be perfectly matched so phase errors are introduced for longer integration times. Once the first correlation run is complete another identical run is completed and so on until a sufficient quantity of data has been gathered. Each correlation run yields a complex result and during acquisition only the absolute value of this result is typically retained. These absolute values from each run are accumulated, a process known as non-coherent summation. The particular lengths used for the coherent and non-coherent integrations depend on the stage of acquisition and the uncertainties in the receiver. For example when detecting weak satellites many hundreds of non-coherent integrations may be performed.

The data set resulting from each correlation run could be used to plot the modulus of the function h(τ). If there are no coherent interferers present then this function would be expected to show a single peak at a well-defined value of τ which could be identified and used to calculate the code phase offset of the signal and thus, in combination with knowledge of the satellite locations, the distance to the satellite. However, the presence of coherent interferers produces multiple peaks, leading to confusion as to which code phase offset is the correct one for locking-on to satellite 2. In the prior art, contaminated search bins are discarded by using detailed parametric data relating to potential interference sources to identify spurious peaks. The method of the present example does not need any additional parametric information to determine whether the signals in a particular search bin are likely to be contaminated by coherent interferers.

Figures 1, 5A:
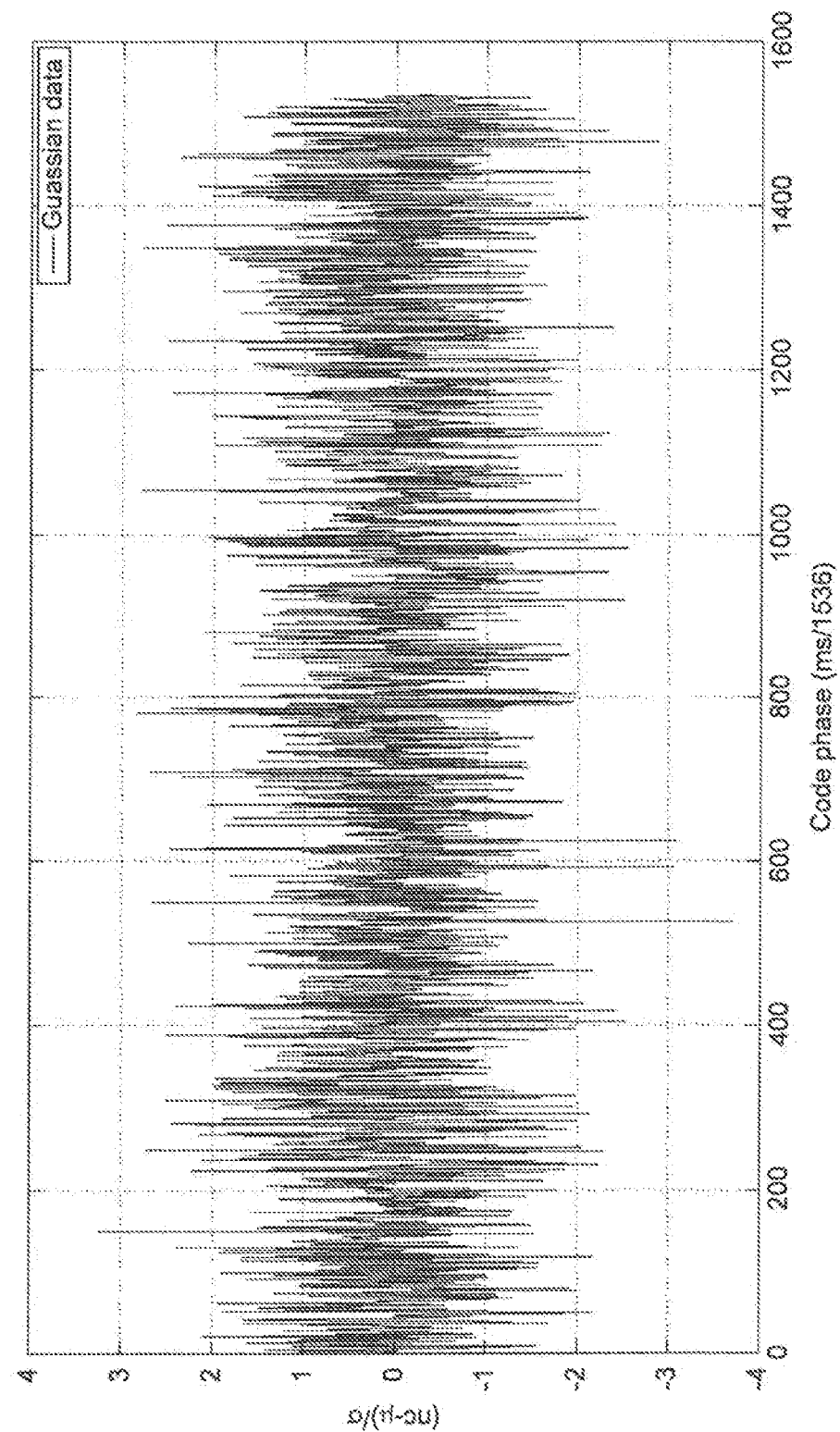
Figures 2, 5A:
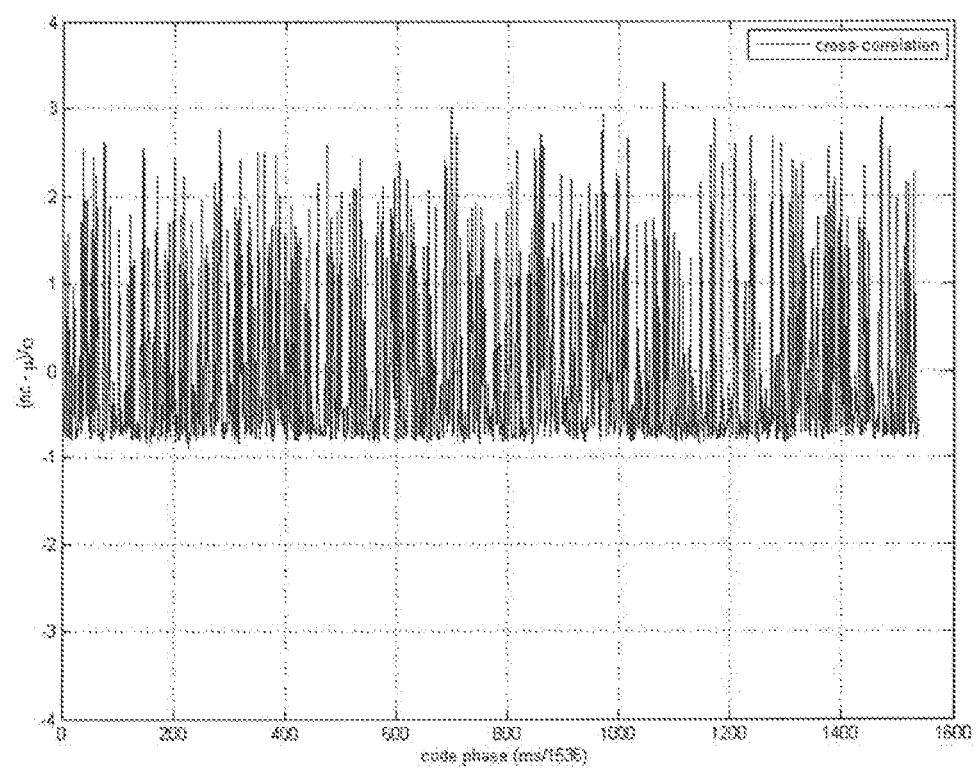

As mentioned above the output from the matched filter after each coherent integration is a set of complex samples which spans the period of the code. Each sample within the set corresponds to a different value of the code phase $\tau$. The samples in each set are labelled from n=1 to n=N. The sample set from each consecutive correlation run is labelled by m ranging from m=1 to m=M. The absolute values (abs) of the samples may be recorded. The absolute value of the $n^{th}$ sample in the $m^{th}$ set is $|h_m(n\Delta\tau)|=s_{m,n}$. These sample values are accumulated by non-coherent summation (NCS) in an NCS integrator 6. (The absolute values must be taken prior to summation in order to avoid complex values cancelling each other out.) When the matched filter 5 completes its first correlation run, labelled m=1, its N samples are stored in the NCS integrator 6. When the second correlation run (m=2) is complete the new N samples are added to the respective previous N samples and so on to the final run (m=M) so that a running total is kept of the correlation results for each phase offset. FIG. 2 shows a table of the values stored by the NCS integrator 6 and will be referred to in more detail later.

The results of the NCS process may be passed to a statistical analyser 7 which can calculate some statistical function or functions from them and pass this statistical data to a decision unit 8. The decision unit 8 can use this statistical data to identify whether or not the particular search bin (the set of code phases for the satellite 2's specific PN code and frequency) is likely to be contaminated with coherent interference and thereby to determine whether or not to lock-on to the satellite 2.

The process described above may be repeated for the search bins associated with other known satellites until a sufficient number of satellite signals have been accepted as clean and locked-on to for the positioning device to be able to estimate its position. The receiver may search many (e.g. 100) different search bins in parallel.

Thus a method of non-parametrically detecting coherent interferers which cause cross-correlations during signal acquisition is provided which identifies contaminated bins by the statistical signature produced by the impact of coherent interferers on multiple code phases in a search bin.

The method can comprise estimating the statistical signature which could be expected from the NCS results in the absence of coherent interferers and comparing this with the statistical signature of the empirical NCS results. Deviations from this expected statistical behaviour may then be treated as indicative of the presence of coherent interferers. Since coherent interferers may be expected to affect multiple code phase bins at a given PN and frequency (search bin), statistics can be calculated on a per search bin basis.

Any method which continuously monitors the expected and actual statistical properties of the non-coherent accumulation on a search bin by search bin basis may be used to detect coherent interference.

For example, the expected standard deviation of the NCS integrator output in a search bin in the absence of coherent interferers may be calculated by measuring the mean of the NCS integrator output that would be expected for a clean input and using a known relationship between the mean and standard deviation for such an input. The actual standard deviation of the empirical NCS integrator output in the search bin may then be measured and compared with the predicted value. If the search bin is free of coherent interferers the ideal ratio of the two standard deviations is 1.

For a typical GPS receiver the GPS power density is below the thermal noise floor, therefore in the absence of coherent interferers the input to the matched filter looks like additive white Gaussian noise (AWGN). (The GPS signal is distinguishable over the thermal noise floor as a result of processing gains introduced by the integrations.) For such an AWGN input it is possible to calculate expected statistical behaviour. Example methods for doing this are given below.

Example Methods for Predicting the Standard Deviation of NCS Integrator Output in a Search Bin in the Absence of Coherent Interference The expected search bin mean and standard deviation which the real received signal is tested against, that is the statistical behaviour of an AWGN input under the null hypothesis in which no coherent interferers are present, may be calculated as follows.

For an AWGN input after correlation and abs the absolute sample values are distributed as Rayleigh variates. The known relationship between the mean of the abs values for correlation run m ($\mu_m$) and their standard deviation ($\sigma_m$) is:

$$\sigma_m = \mu_m \sqrt{\frac{4-\pi}{\pi}} \qquad (2)$$

That is, the standard deviation of the abs values for correlation run m ($\sigma_m$), is equal to the mean of the abs values for that correlation run ($\mu_m$) multiplied by the square root of: four minus pi, all divided by pi.

For convenience, the constant factor alpha equal to the square root of: four minus pi, all divided by pi is introduced:

$$\alpha = \sqrt{\frac{4-\pi}{\pi}} \qquad (3)$$

This allows equation (2) to be rewritten as:

$$\sigma_m = \alpha \mu_m \qquad (4)$$

That is, the standard deviation of the abs values for correlation run m ($\sigma_m$), is directly proportional to the mean of the abs values for that correlation run ($\mu_m$), with constant of proportionality alpha, defined by equation (3).

The mean for each correlation run can be written in terms of the standard deviation of the incoming IQ data as follows:

$$\mu_m = \sqrt{\frac{N\pi}{2}} \sigma_{iq} \qquad (5)$$

That is, the mean of the abs values for a correlation run m ($\mu_m$) is directly proportional to the standard deviation of the pre-correlation IQ data ($\sigma_{iq}$). The constant of proportionality is the square root of: the number of samples in each correlation run (N) multiplied by pi on 2.

After non-coherent summation of M correlation runs the mean of the search bin (μ) is given by the sum of all the correlation run means ($\mu_m$) thus far:

$$\mu = \sum_{m=1}^{M} \mu_m \quad (6)$$

As the samples are uncorrelated their variances add:

$$\sigma^2 = \sum_{m=1}^{M} \sigma_m^2 \quad (7)$$

That is, the variance for the search bin under consideration after non-coherent integration of M correlation runs ($\sigma^2$) is equal to the sum over correlation runs labelled m=1 to m=M of each correlation run variance ($\sigma^2_m$).

Continuous Accumulation Method

Equations (6) and (7) may be applied directly to estimate the mean and variance respectively as they accumulate. For example, if the mean for the search bin under consideration after non-coherent integration of M correlation runs (μ) is known through measurement then:

$$\mu_M = \mu - \mu_{M-1} \quad (8)$$

That is, the mean for current correlation run M ($\mu_M$) may be calculated by subtracting the mean for the previous correlation run ($\mu_{M-1}$) from the mean for the search bin as measured by processing the current correlation run (μ).

Similarly:

$$\sigma^2_M = \sigma^2 - \sigma^2_{M-1} \quad (9)$$

That is, the variance for current correlation run M ($\sigma^2_M$) is equal to the variance for the search bin as found by processing the current correlation run ($\sigma^2$), minus the variance for the search bin found by processing the previous sample ($\sigma^2_{M-1}$).

Thus, by rearranging equation (9) and substituting using equation (4), the variance for the search bin under consideration ($\sigma^2$) may be obtained as:

$$\sigma^2 = \sigma^2_{M-1} + \alpha^2 \mu^2_M \quad (10)$$

That is, the variance for the search bin under consideration as found by processing the current sample ($\sigma^2$), is equal to the variance for the previous correlation run ($\sigma^2_{M-1}$) plus: alpha squared multiplied by the square of the current correlation run mean ($\mu^2_M$).

Using equations (8) and (10) the value found for the expected variance (and hence its square root, the expected standard deviation) for the search bin may be updated after every sample.

Whether this continuous accumulation is useful or not depends on how rapidly the AGC changes during an integration. If the AGC is strongly time-dependent then so is the input standard deviation of the IQ data ($\sigma_{iq}$) and the continuous accumulation method above must be used. If however the AGC varies slowly or insignificantly (for example, by less than twenty percent) with time then the input standard deviation of the IQ data ($\sigma_{iq}$) may be approximated to a constant value and the method below may be used.

Constant Input Variance Method

In scenarios where continuous accumulation is not necessary, an alternative is to assume that the input variance is constant and use the formula derived below. This method requires less computational work which is an advantage in modern signal receivers where signal processing takes place in real time, making efficiency critical. Even when constant input variance is assumed, there is still some resistance to small changes in the AGC with time since the quantities measured by the statistical analyser 7 are proportional to the input standard deviation of the IQ data ($\sigma_{iq}$).

First define a factor κ equal to the standard deviation for the search bin (σ) multiplied by the square root of the number of correlation runs (M), divided by: alpha times the mean for the search bin (μ).

$$\kappa = \frac{\sigma \sqrt{M}}{\alpha \mu} \quad (11)$$

Using equations (7) and (4) σ may be found as:

$$\sigma = \alpha \sqrt{\sum_{m=1}^{M} \mu_m^2} \quad (12)$$

That is, the standard deviation for the search bin (σ) is equal to alpha times the square root of the sum over correlation runs labelled m=1 to m=M of each squared correlation run mean ($\mu^2_m$).

If the input variance ($\sigma_{iq}$) is constant then, by equation (5), the correlation run mean ($\mu_m$) must also be constant. Therefore for all correlation runs, the correlation run mean ($\mu_m$) is always equal to a constant value $\mu_0$:

$$\mu_m = \mu_0 \quad (13)$$

Thus, equation (12) becomes:

$$\sigma = \alpha \mu_0 \sqrt{M} \quad (14)$$

That is, the standard deviation for the search bin (σ) is equal to alpha times the constant correlation run mean ($\mu_0$) times the square root of M.

Using the constant correlation run mean in equation (6) the mean for the search bin (μ) may be found to be equal to $\mu_0$ times M:

$$\mu = \sum_{m=1}^{M} \mu_0 = \mu_0 M \quad (15)$$

Substituting equations (14) and (15) into equation (11) gives:

$$\kappa = \frac{\alpha \mu_0 \sqrt{M} \sqrt{M}}{\alpha \mu_0 M} = 1 \quad (16)$$

That is, factor kappa is equal to one. By substituting equation (16) back into equation (11) a relationship between the mean and standard deviation of the NCS integrator output in the search bin as a function of how far the integration has progressed is obtained:

$$\sigma = \frac{\alpha}{\sqrt{M}} \mu \quad (17)$$

That is, the standard deviation for the search bin (σ) is equal to alpha over the square root of M, all multiplied by the mean for the search bin (μ).

The constant input variance approach can be expected to break down when the incoming standard deviation is not constant over the course of the integration. In that case the implicit assumption made, that the sum of the variances is the same as the sum of the mean variance, does not hold.

If the AGC remains reasonably constant throughout the integration then equation (17) should provide a reasonably good approximation. However, if the AGC varies significantly over the integration, for example by greater than twenty percent, then it may be more appropriate to use the continuous accumulation approach which works for any AGC profile.

Figure 3A:
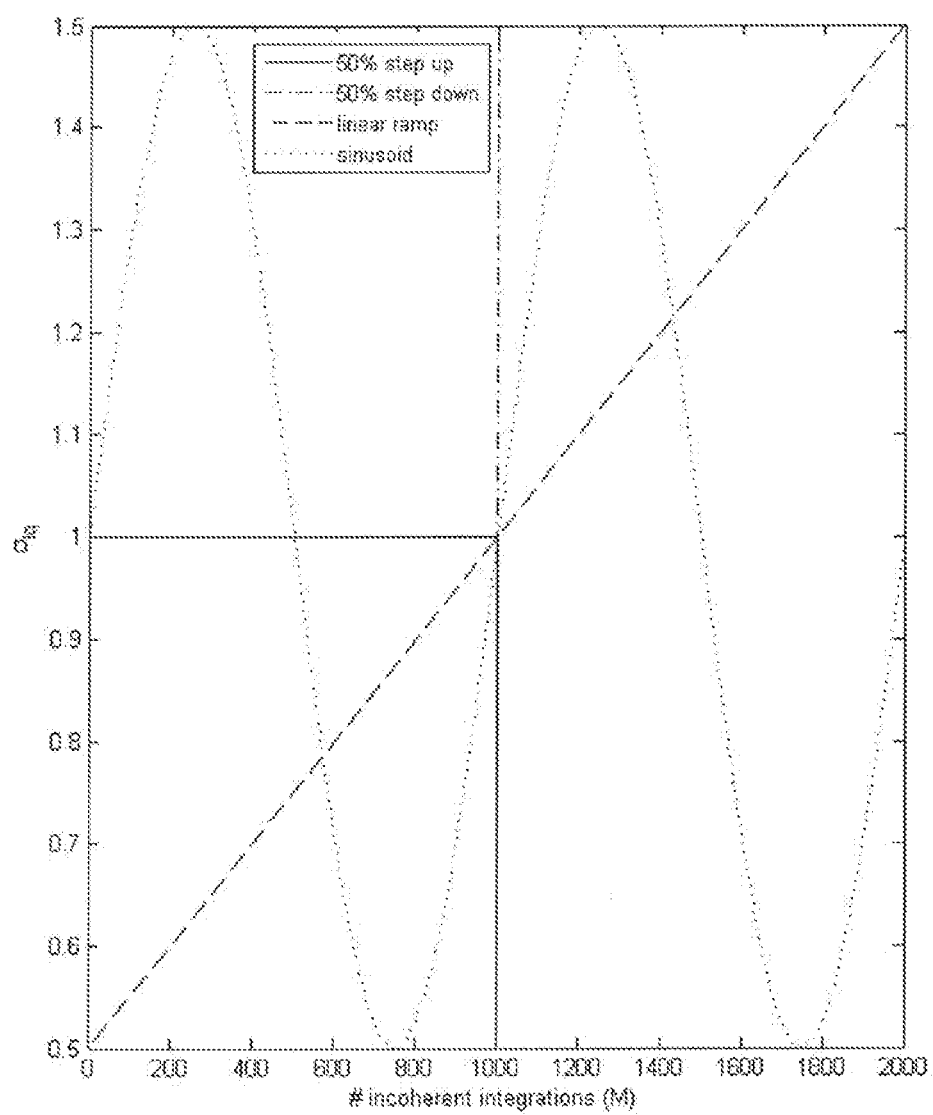
FIG. 3a shows a selection of AGC profiles.
Figure 3B:
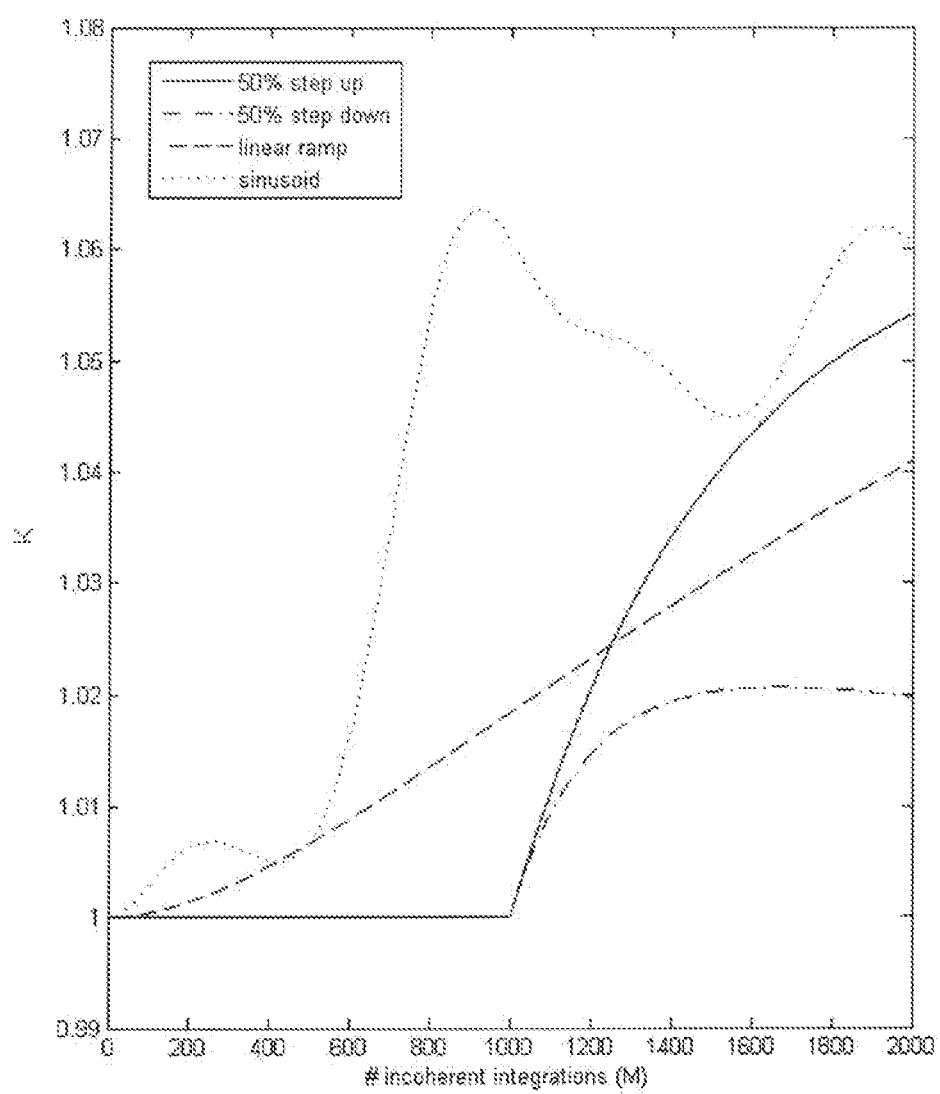

FIGS. 3a and 3b are provided to illustrate the impact of different AGC profiles over the course of the integration, up to two thousand correlation runs. FIG. 3a shows plots of some different integration AGC profiles with input standard deviation ($\sigma_{iq}$) plotted over two thousand correlation runs. These are: fifty percent step up from $\sigma_{iq}=1$ at M=1000, fifty percent step down from $\sigma_{iq}=1$ at M=1000, linear ramp from $\sigma_{iq}=0.5$ with gradient 0.0005 and sinusoid starting at $\sigma_{iq}=1$ with amplitude 0.5 and period 1000 correlation runs. FIG. 3b shows the corresponding effect on kappa. It can be seen that the deviations from kappa equals one do not exceed ten percent over this integration length for these AGC profiles; kappa is relatively insensitive to the AGC profile.

Example Method for Calculating the Actual Standard Deviation of the NCS Integrator Output in a Search Bin The example hardware proposed for performing the claimed method is capable of automatically measuring both the total current NCS integrator output for a search bin (Y) and also the sum of all the absolute values of: the NCS integrator output for each sample minus a number that can be set for the search bin (X):

$$X = \sum_{n=1}^{N} |S_n - S_0| \quad (18)$$

$$Y = \sum_{n=1}^{N} S_n \quad (19)$$

That is, the hardware measures NCS integrator output values ($S_n$) and computes both X, the sum of the absolute differences between each NCS integrator output value ($S_n$) and a set value ($S_0$), and Y, the sum of all the NCS integrator output values. If the set value ($S_0$) is set equal to the search bin mean (μ), i.e.

$$S_0 = \mu \quad (20)$$

then Y is proportional to that mean and X is proportional to the search bin standard deviation (σ).

The constant of proportionality between X and the standard deviation may be calculated by assuming a specific distribution for the abs values. The incoming IQ data is largely thermal noise and thus is distributed as a Gaussian. Therefore the output from the matched filter is a complex Gaussian. The absolute value of a complex Gaussian distribution is a Rayleigh variate but, due to the central limit theorem, the NCS integrator output returns to a roughly Gaussian distribution. For a Gaussian distribution, the standard deviation for the search bin after M correlation runs (σ) is:

$$\sigma \approx \sqrt{\frac{1}{N}\sum_{n=1}^{N}(S_n-\mu)^2} \approx \sqrt{\frac{\pi}{2}}\frac{1}{N}\sum_{n=1}^{N}|S_n-\mu| = \frac{1}{N}\sqrt{\frac{\pi}{2}}X \quad (21)$$

That is, the standard deviation for the search bin (σ) for a Gaussian distribution is approximated by the square root of the maximum likelihood estimate for the variance. The maximum likelihood estimate for the variance of a Gaussian distribution is one over the number of samples (N), multiplied by the sum over N samples of the square of: the NCS integrator output for each sample ($S_n$) minus the mean for the search bin (μ). This expression is approximately equal to the square root of one half pi, divided by N, multiplied by the sum over N samples of the modulus of: the NCS integrator output for each sample ($S_n$) minus the mean for the search bin (μ). Thus, if equation (20) holds, the standard deviation for the search bin may be calculated by multiplying X by the square root of one half pi, and dividing by N.

The above method requires an accurate estimation of the mean so that equation (20) approximately holds. One way of estimating μ is to take the mean from the previous loop and use it to set the mean for the current loop with a small correction added to account for having added one further term. The small correction can be re-calculated occasionally to avoid having to perform a division every loop. For example, $S_0$ could be set equal to the mean for the search bin as calculated after M−1 correlation runs, plus a correction factor which is the current estimate of how much the mean changes per correlation run. This correction factor could be re-calculated on every power of two as the current search bin mean shifted by the appropriate amount. Therefore the number of computationally-hungry divisions necessary would be low. Alternatively, $S_0$ may be set to an estimated mean that is roughly correct and then corrected after evaluation once the true mean has been observed.

The Ratio of Predicted to Measured Standard Deviation

Recall that if the ratio of predicted to measured standard deviation for a search bin is close to one then the search bin is considered to be free of coherent interferers. In order to calculate this ratio (R), note that μ appearing in equation (17) is the mean for the search bin after non-coherent integration of N samples, and is thus equal to Y divided by N:

$$\mu = \frac{Y}{N} \quad (22)$$

Therefore the ratio of expected (calculated using the constant input variance method) to actual standard deviation for the search bin is given by equation (17) divided by equation (21), substituting for p using equation (22) and alpha using equation (3):

$$R = \frac{\sigma_{theory}}{\sigma_{measured}} \quad (23)$$

$$= \frac{\frac{\alpha}{\sqrt{M}}\mu}{\frac{1}{N}\sqrt{\frac{\pi}{2}}X}$$

-continued $$= \frac{\frac{\alpha}{\sqrt{M}} \frac{Y}{N}}{\frac{1}{N}\sqrt{\frac{\pi}{2}} X}$$

$$= \alpha \sqrt{\frac{2}{\pi M}} \frac{Y}{X}$$

$$= \frac{\sqrt{2(4-\pi)}}{\pi} \frac{1}{\sqrt{M}} \frac{Y}{X}$$

That is, the ratio of predicted to actual standard deviation for the search bin is the square root of: two times four minus pi, all divided by pi, all multiplied by one over the square root of M, all multiplied by the quotient of: the sum of all the absolute sample values in a search bin (Y) and the sum of the absolute differences between the value of absolute sample value and the mean for the search bin (X).

Cross-Correlation Rejection

If there is a coherent interferer in a search bin then this will have a substantial impact on R. This is because the cross-correlation accumulates linearly just like for the target signal rather than in a random diffusive manner as noise does. Thus, even for weak interferers well below the thermal noise floor their size grows proportionally to the integration time so that after sufficient integration time even a very weak interferer will be above the nominal noise floor. Simply increasing the threshold above which a cross-correlation peak is identified as a candidate code phase offset for the target signal will therefore only delay the time when a spurious signal will be identified, and additionally de-sensitizes the receiver to the target signal. If the target GPS satellite signal is detected then a single cross-correlation peak will be observed, so the search bin mean will rise, but the standard deviation will stay approximately constant. However, unlike a real GPS signal coherent interferers impact multiple code phases in a search bin and thus provide a statistical signature that allows contaminated bins to be identified by raising the search bin standard deviation above that expected for a clean signal, and hence lowering R below 1 (the quantity X, proportional to the search bin standard deviation, is in the denominator of the expression for R in equation (23)).

Figure 4:
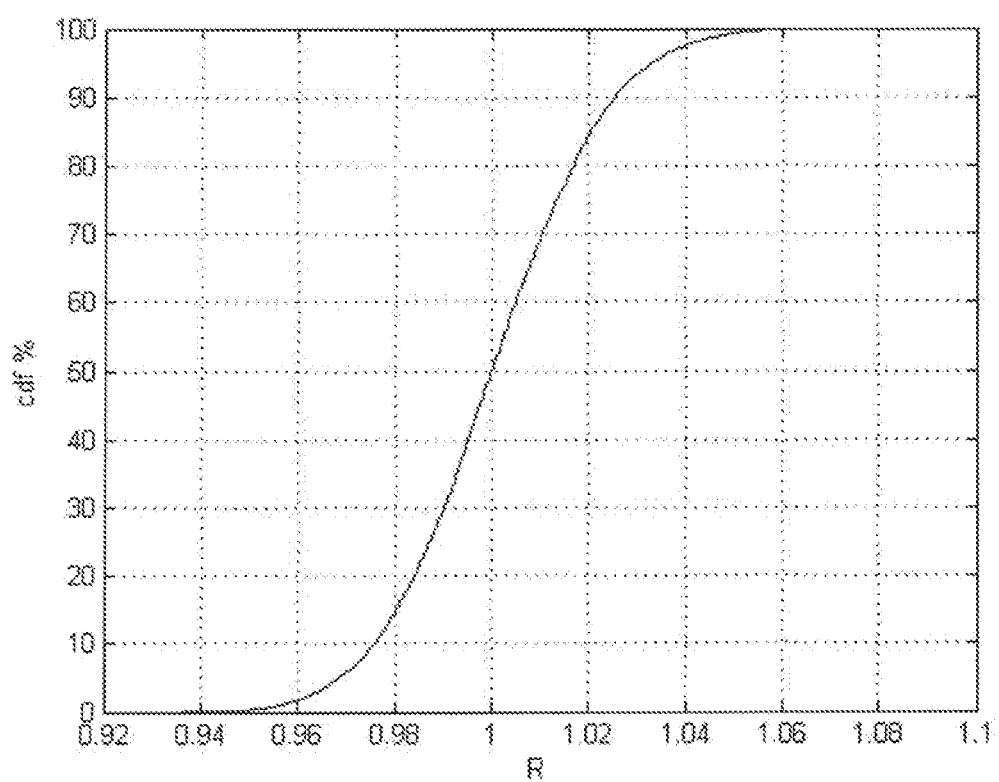
FIG. 4 shows a cumulative distribution of R.

FIG. 4 shows R plotted against cumulative density for an N=1536 search bin and AWGN input. The standard error in the measurement of standard deviation in this case is 1.95%. This scales approximately as the inverse root of the number of samples. Under the null hypothesis (AWGN input) in this example, R is always within the range 0.9-1.1. Therefore a search bin could be deemed to be suspect if its value of R fell outside of this range.

In practice the predicted and observed standard deviations themselves could be calculated directly, or their ratio could be calculated in isolation using equation (23). This could be done using, for example, a digital signal processor. In order to improve processing speed and maintain sufficient efficiency to meet the real time requirement the main operations used in the coding for the calculations could be single cycle instructions on the digital signal processor such as multiples, bit-shifts, additions and msb. For example, in order to avoid carrying out a division to calculate R, Y could be compared with the product of: X and the square root of M (from equation 23 it may be seen that R is proportional to the quotient of these two quantities therefore comparing their size is essentially evaluating R).

Accepting only a narrow range of R values results in fewer false alarms when candidate code phases of correlation peaks from search bins deemed to be clean are presented to the next stage of the acquisition process for verification.

Candidate Code Phase Offset Identification

Once a search bin has been classified as clean, candidate code phase offsets can be identified from sample values. A candidate code phase offset ($n\Delta\tau$) may be, for example, that of a sample n with a value ($s_n$) which exceeds a certain multiple ($\phi$) of the search bin standard deviation ($\sigma$). Therefore, after M correlation runs the NCS integrator output value for an offset divided by M ($S_n/M$) could be compared to a threshold ($\phi\sigma$) which is a multiple ($\phi$) of the search bin standard deviation ($\sigma$). This multiple could be, for example, four. Code phase candidates could also be obtained at sub-integer values of n by interpolation.

Identification of candidates therefore requires an estimate of the search bin standard deviation ($\sigma$). This could be an empirical estimate, calculated from a measurement of X, or a theoretical value for an AWGN input calculated using equations 2 and 5 (for a clean search bin they should be approximately equal). The empirical standard deviation generally exceeds the theoretical standard deviation due to the effects of non-AWGN noise. Therefore using the empirical standard deviation usually provides a higher threshold and consequently the identification of fewer candidates. The empirical standard deviation could therefore be used when R<1 (ie when coherent interferers are more likely to be present) and the theoretical standard deviation could be used when R>1.

Figure 5B:
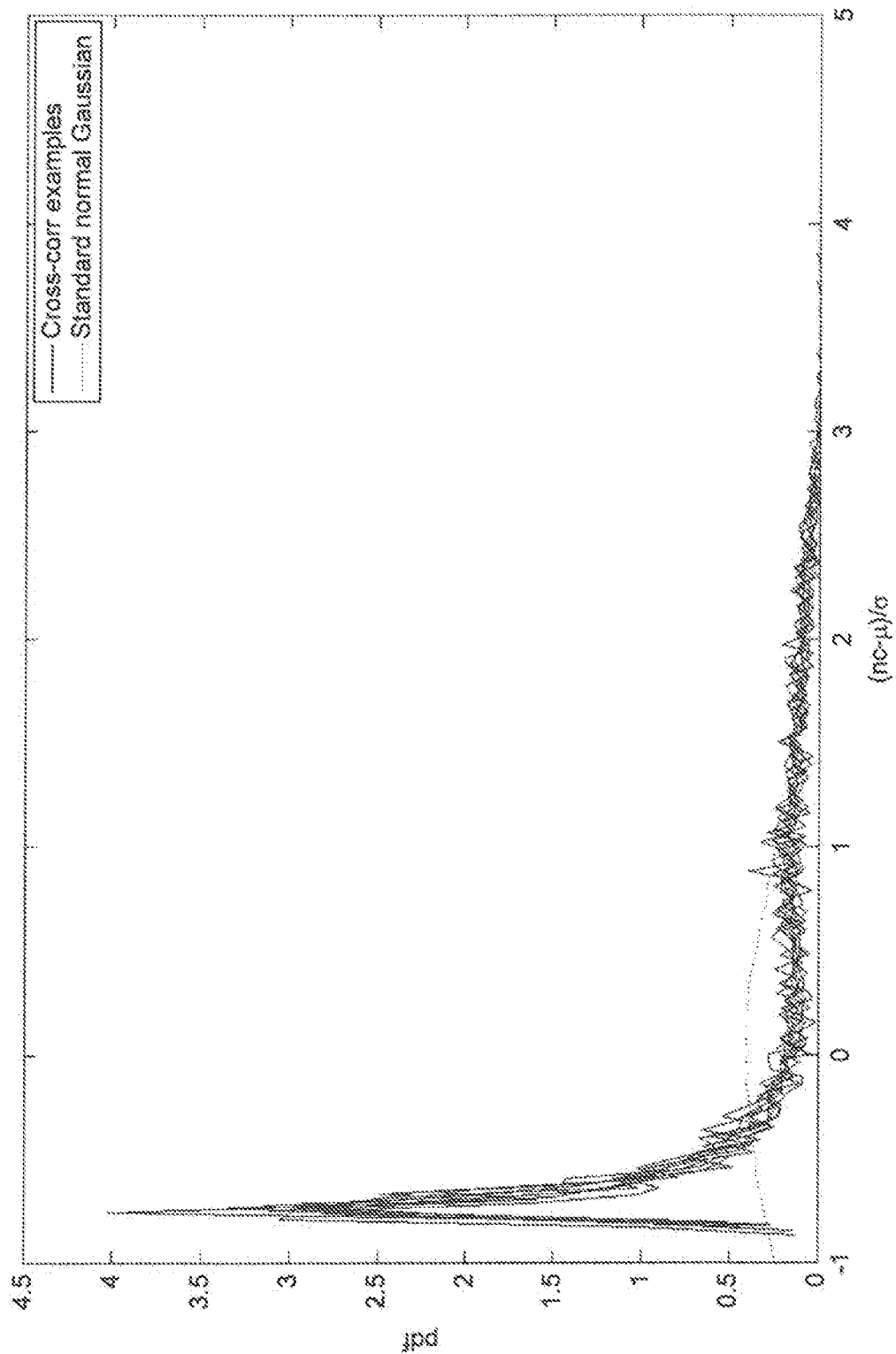

Even when using the empirical standard deviation for thresholding, random noise can lead to false alarms being generated for candidates which are the result of noise, not a signal from the target satellite. This effect is illustrated in FIGS. 5a, 5b and 5c which show example cross-correlations after removal of the mean and division by the standard deviation. FIGS. 5a-1 and 5a-2 show a single example (in FIG. 5a-2) compared to Gaussian data (in FIG. 5a-1). The cross-correlation results are clearly skewed to higher values than a pure AWGN input would give. FIG. 5b shows the probability density function (pdf) for ten different PN pairs and a reference Gaussian. This shows that in the presence of cross-correlation the distribution is clustered round zero but has a long tail. FIG. 5c shows the corresponding cumulative distribution function (cdf). The excess visible in the cdf for points in the region greater than one standard deviation means that there are a lot of points positioned above where they would be by chance.

In the presence of strong cross-correlation refinements are possible that significantly further reduce the number of false alarms. Some examples of these refinements will now be described.

Multi-Level Classification

Multiple classification levels could be used for blacklisting, greylisting or whitelisting particular search bins based on the R value they exhibit. Search bins exhibiting R values further from one than the most extreme classification boundaries could be automatically rejected and not used at all; these would form the blacklist. Search bins exhibiting R values closer to one than the least extreme classification boundaries (for example between 0.9 and 1.1) could be automatically trusted; these would form the whitelist. Search bins exhibiting suspicious values of R outside of the safe whitelist range but not as bad as those which warrant blacklisting would form the greylist. Greylisted search bins could have stricter thresholds imposed on further correlation runs by increasing the value of $\phi$ used.

Under this cross-correlation detection scheme below a certain value of R (for example R<0.75) a bin is blacklisted and not used. Search bins with R values unlikely to be produced on a clean search bin by chance are greylisted and their thresholds raised. Thus they still have a chance to recover but any real signals must become cleaner before they are accepted.

The threshold modifications applied to the greylisted search bins could also be multi-level. For example the threshold modifier $\phi$ could be increased by 1 for search bins with R values between 0.90625 and 0.9375, by 3 for search bins with R values between 0.84375 and 0.90625 and by 4 for search bins with R values between 0.75 and 0.84275. $\phi$ would be effectively infinite for the blacklisted search bins with R values below 0.75.

Figure 6A:
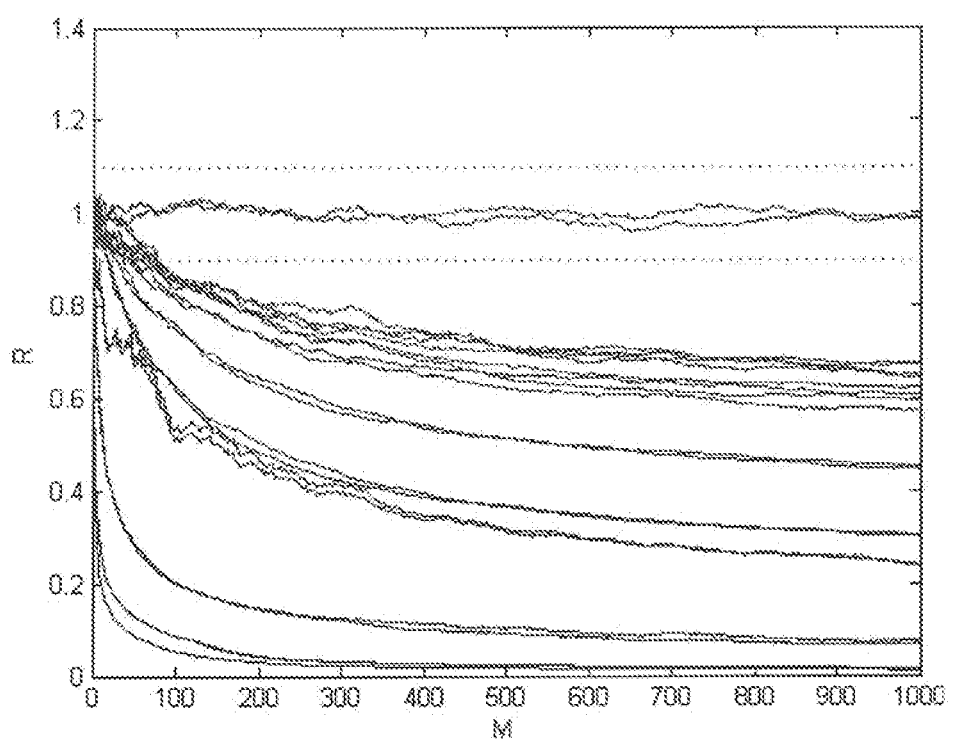
FIG. 6a plots R for a contaminated input signal.
Figure 6B:
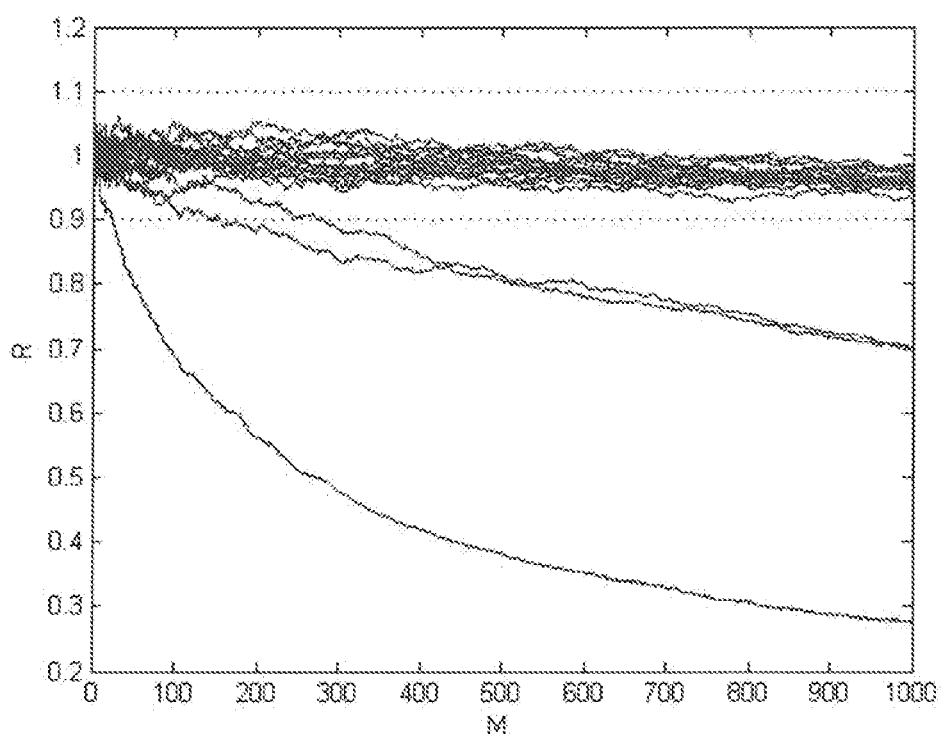
FIG. 6b plots R for a different contaminated signal.

Example results including coherent interferers affecting some search bins are shown in FIGS. 6a and 6b. The dashed lines are at R=0.9 and R=1.1 and represent the envelope expected under the null hypothesis. R is plotted as a function of integration time for 21 frequency bins. The frequency bins are spaced at 55.5 Hz with the centre bin on zero and have a coherent integration time T of 12 ms. In FIG. 6a the bins are centred on a −110 dBm (approximately 60 dBHz) cross-correlation. All but two frequency bins are quickly distinguishable from the null hypothesis. Those two bins survive and are deemed free of coherent interference and thus safe to use. In FIG. 6b the bins are centred on a −130 dBm (approximately 40 dBHz) cross-correlation. In this case only 3 bins appear to have coherent interference present.

Variable Classification Boundaries

Figure 7:
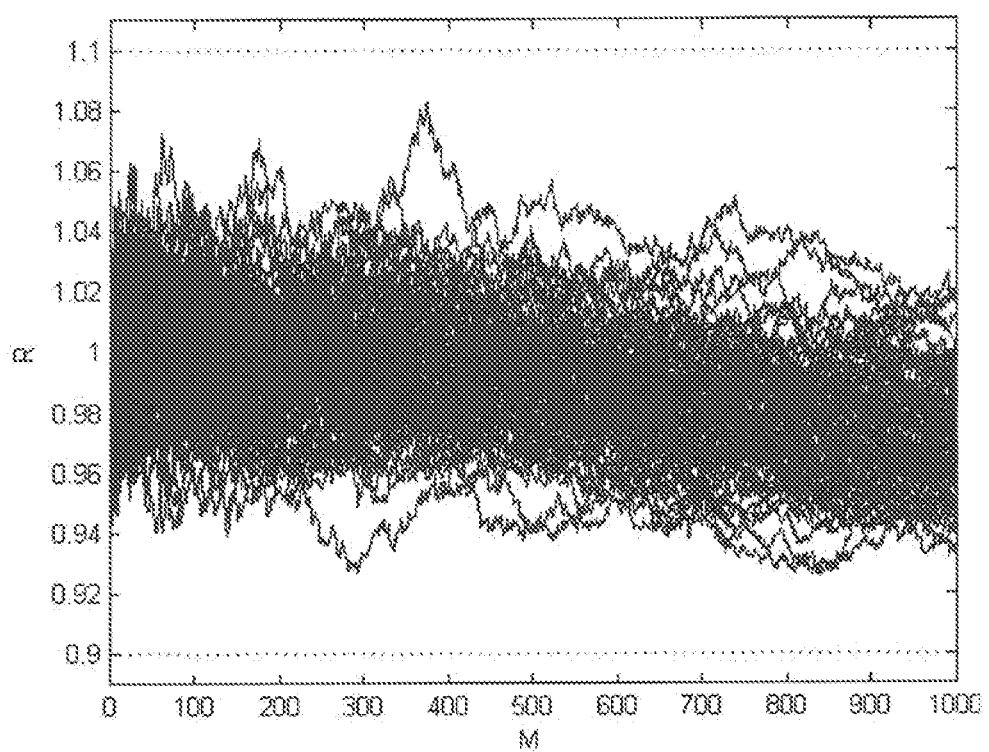
FIG. 7 illustrates the null hypothesis.

FIG. 7 shows R as a function of integration time for one hundred search bins as calculated under the null hypothesis. With no coherent interference in the search bin R takes a value close to one. It can be seen that there is a slight drift towards negative values over long integration times. This is due to quantisation noise in the block floating point representation used. With values of M around one to two thousand this effect is negligible.

Figure 8:
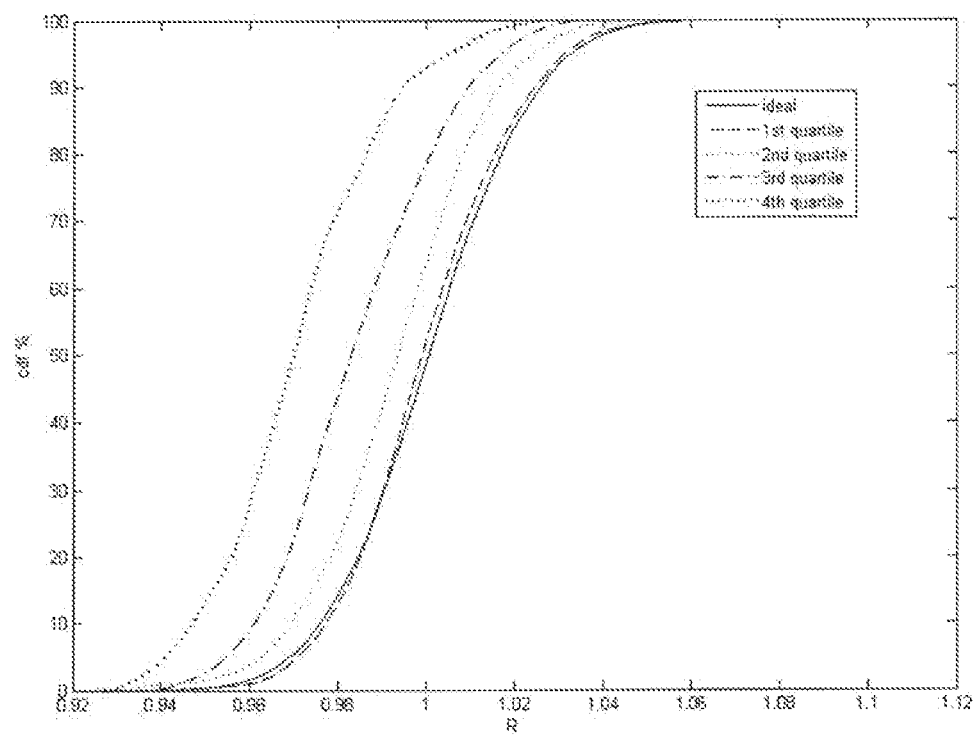
FIG. 8 illustrates quantisation noise drift.

FIG. 8 illustrates that even though there is a slight drift towards negative values of R on progressing through the quartiles of the integration due to block floating point quantisation noise in the algorithm used, the distribution remains within the 0.9 to 1.1 range over the 1000 run process of FIG. 7. Therefore if the integration length is limited the quantisation noise should not pose a problem.

Figure 9:
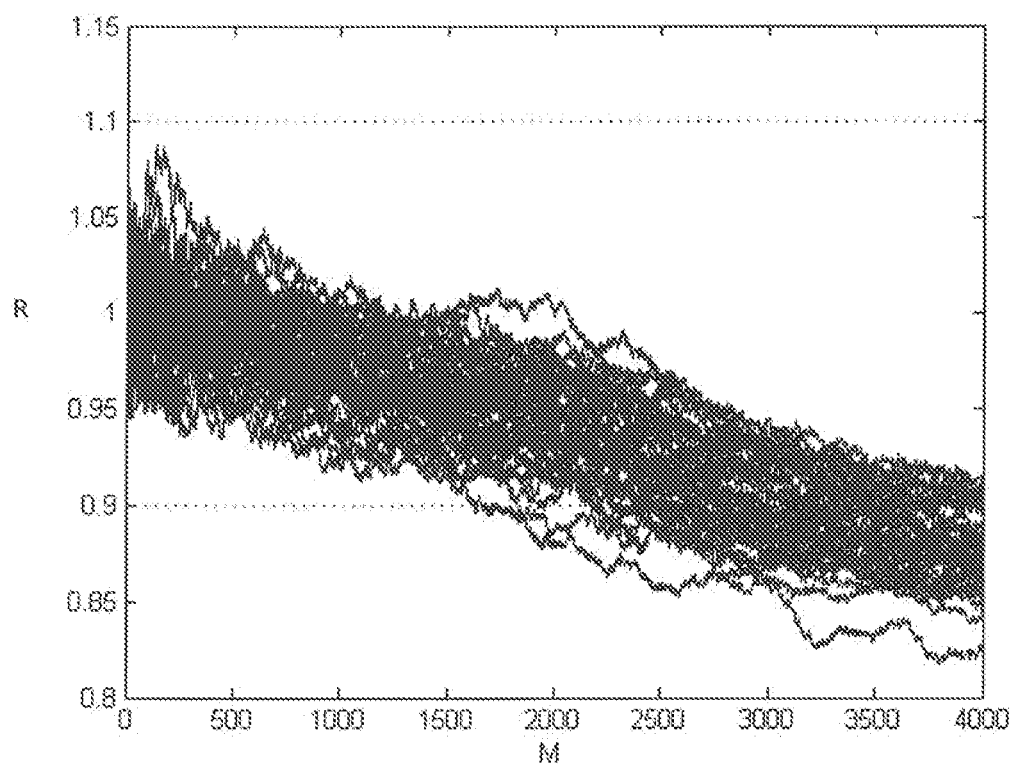
FIG. 9 illustrates quantisation noise drift for a long integration time.

However, for longer integration (for example around M=4000), the quantisation error drift could be significant enough to incorrectly trigger coherent interferer detection. FIG. 9 shows R values as low as 0.85 from clean signals after 4000 correlation runs. This situation can be avoided by modifying the classification boundaries to take the quantisation noise into account. For example, the boundary value of R used to determine whether a cross-correlation is present or not could, instead of being a flat value such as 0.9 over the whole process, be lowered over the course of the integration to compensate for the effects of quantisation noise. This technique could be applied to all the classification boundaries if multi-level classification is used.

Threshold Shaping

As can be seen from FIGS. 6a and 6b, there is a short period at the start of the acquisition process where the spurious signals have values of R close to one. This could result in spurious signals being accepted if the thresholds were flat. Therefore it may be preferable to increase the thresholds by temporarily increasing $\phi$ during a grace period near the start of the integration, then restore them to their normal levels so as not to detract from the ultimate sensitivity of the method.

Thus there could be a grace period during which the thresholds are set closer to one standard deviation than normal to avoid incorrect identifications of cross-correlations as usable signals. This technique slows down the acquisition time slightly but the balance between speed and accuracy should be suitable for intermediate strength signals.

Figure 10:
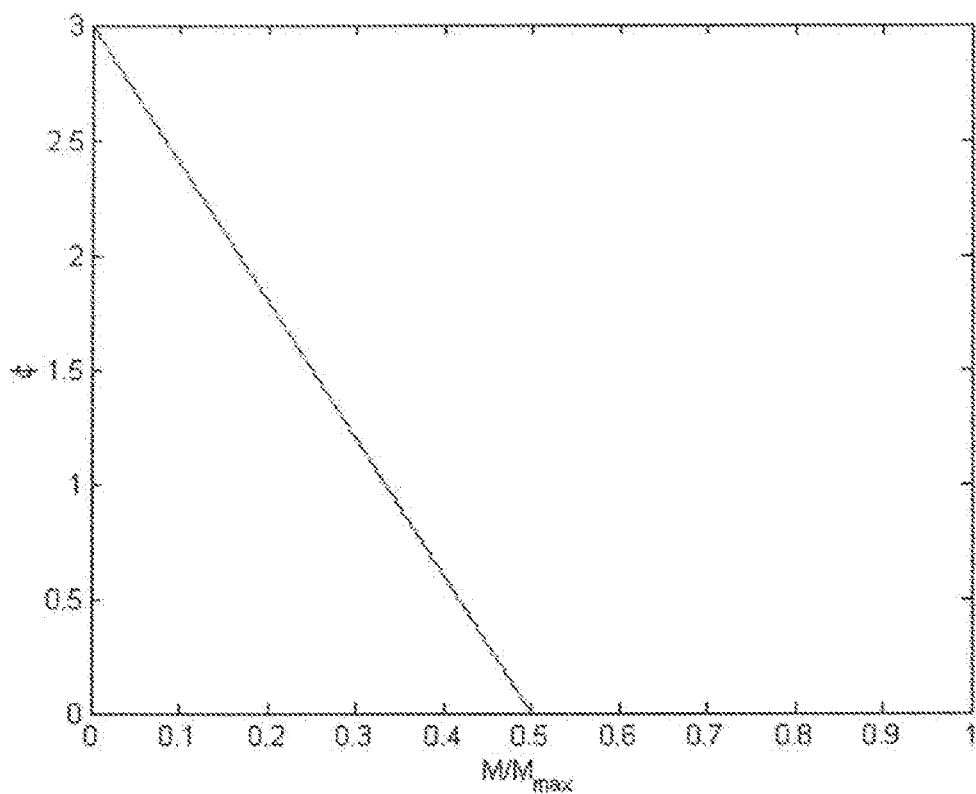
FIG. 10 shows an example threshold shaping scheme.

The grace period could be set so that cross-correlations from satellites 20 dBs above the search sensitivity will reveal themselves, that is have R values less than 0.9 (or some other classification boundary). The thresholds could, for example, be modified linearly as in FIG. 10, being high at the start of the acquisition process and reducing gradually until reaching their standard levels around half-way through the total number of correlation runs, where the thresholds would level out. The initial threshold level and grace period could be configurable but applicable to all the searches.

Limiting the Number of Candidates

Another precaution to prevent acceptance of spurious cross-correlations could be to limit the number of candidate code phases allowed per search bin before that bin is grey or blacklisted. The thresholds may be set such that two candidates in a search bin would be unusual, three improbable and four practically impossible for a clean signal. Consequently, if the number of candidates from a specific search bin exceeds three then that bin could either be rejected or integrations re-run on it with a higher threshold.

As soon as a candidate is identified and submitted to verification, the corresponding code phase bin in the acquisition could be set to, for example, the mean search bin value so that any other candidates become visible. If too many other candidates are found then all current verifications on candidates from that search bin could be aborted as they cannot be trusted and it is preferable to free resources.

Re-Inspecting R

Once a candidate signal has been identified by the acquisition engine, it could pass the signal details to a verification engine. While verification is taking place, the acquisition engine could continue to run integrations on the search bin. The final step in the verification could then be to re-check the R value. If this remains within the strictest classification boundaries then the signal could be locked-on to. If however, the R value has crossed a boundary while verification has been running (this could for example be due to a coherent interferer switching on during that time) then the candidate could be rejected or integration on that search bin could be re-run with more demanding thresholds which may depend on R or the change in R. R could also be checked periodically during verification, not just on completion.

Continuous Wave (CW) Interference

This type of coherent interference affects the accumulations differently to interference from satellites and all other types of coherent interference Therefore a separate CW detector could be included. This detector could be implemented before or after signal detection. Alternatively, R can be calculated as before.

For pure tones each point in the cross-correlation has the same absolute value and differs only by a phase shift. Therefore in this idealised case the impact of the CW interference does not depend on the cross-correlation offset.

This can be seen from the expression for a cross-correlation from a pure CW tone at code offset $k\Delta\tau$.

$$|\Gamma_k| = \left|\sum_n c_n e^{-2\pi i f \Delta t(n-k)}\right| \qquad (24)$$

-continued $$= |e^{2\pi i f \Delta tk}| \cdot \left|\sum_n e^{-2\pi i f \Delta t n} c_n\right|$$

$$= \left|\sum_n e^{-2\pi i f \Delta t n} c_n\right|$$

That is, the absolute value of the cross-correlation of all the samples in a search bin with a certain PN and frequency f with a pure CW tone interference signal at code offset τ ($\Gamma_\tau$) is given as the absolute value of the sum over all samples of sample n ($c_n$) multiplied by the exponential of: negative two times pi times i multiplied by the frequency f of the pure tone, the period of the pure tone (Δt), and n minus τ. The exponential term containing τ may be factored out, and is equal to one, leaving an expression for the cross-correlation which does not contain τ.

Equation 24 illustrates both that the absolute value of the cross-correlation for a pure tone is independent of code phase and also that this value is the absolute value of a sum of all the samples from the matched filter each multiplied by a different phase shift. This can be thought of as equivalent to the length of the resultant from a sum of 2D vectors each of which is rotated. At each different frequency the phasing will differ leading the vectors to sum more or less constructively leading to different offsets to the mean absolute value of the cross-correlation.

Consequently, the mean for a search bin containing a pure CW interference tone is elevated, but the standard deviation is not changed as the interference affects all code phases equally. Recall that in equation (23) for R, Y (which is proportional to the mean) is in the numerator, and X (which is proportional to the standard deviation) is in the denominator. Thus CW interference tends to push R above one (assuming the CW signal may be approximated to a pure tone).

In reality, because the PN repeats cyclically periodic boundary conditions are imposed on the cross-correlation, and when the frequency is not consistent with these boundary conditions low frequency structure is introduced into the cross-correlation as a function of code phase. This structure causes R to behave in a similar way as for inter-satellite cross-correlation; that is it drops from high to low over the course of acquisition. In practice narrowband interferers often come close to being ideal, so R will start off with a high value, often much higher than one, but will then reduce over time so that if the number of integrations is high it can drop below one. Therefore for CW interferers it may be useful to use the technique discussed previously of thresholding with the empirical standard deviation when R<1 and the theoretical standard deviation when R>1. With this mechanism in place false alarms due to pure CW interferers should be rare.

Figure 11:
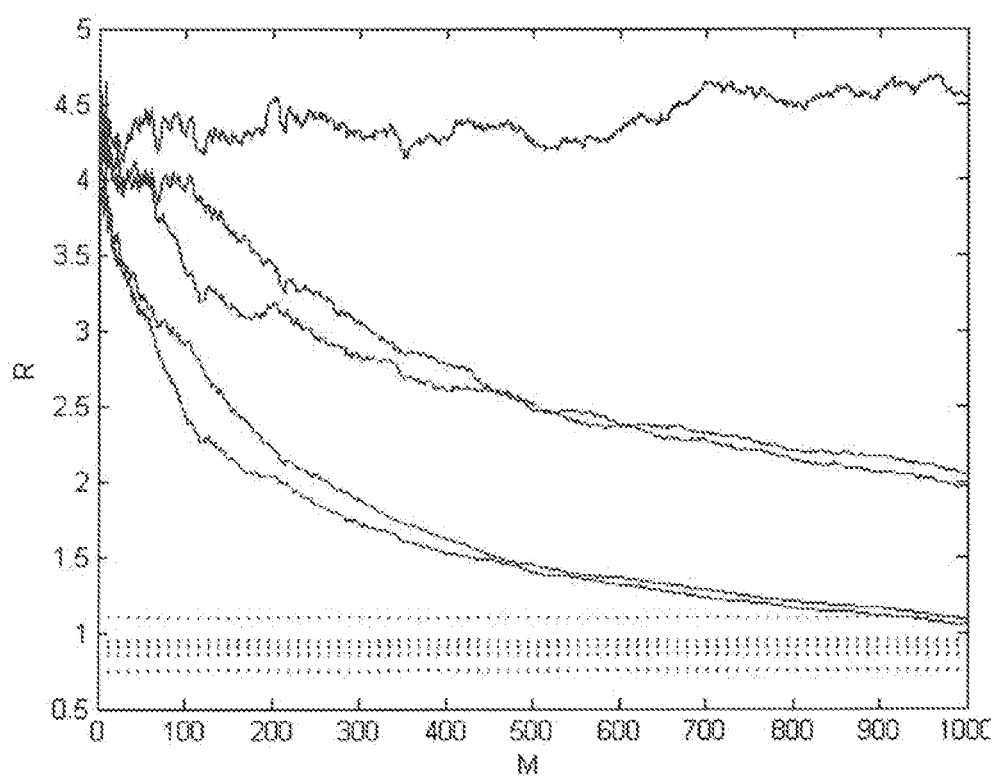
FIG. 11 plots R for a signal contaminated by CW interference.

For example, FIG. 11 shows R plotted for several search bins over the course of acquisition for a pure tone CW interferer at 5 kHz and 60 dBHz. The highest line is for the 0 Hz search bin, the middle pair of lines are for ±10 Hz search bins, and the lowest pair of lines are for the ±20 Hz search bins.

While it is mainly the shape of the lower threshold which matters for satellite-based interference, it can be seen from FIG. 11 that for CW interference it is the upper threshold which could be varied over the course of the integration to ensure that search bins containing CW interference are not locked-on to.

CW rejection could be enhanced by comparing R after m correlation runs to the initial value of R, instead of comparing empirical and theoretical values of R. If there is no CW then the ratio of the current to the initial value of R is almost the same as the current value of R. If there is a CW then the ratio will rapidly drop off and could be rejected using a similar mechanism to that discussed previously.

Instead of performing acquisition on all signals then ignoring contaminated search bins, CW interferers could be identified and excised from the fast Fourier transform during acquisition.

Alternative Techniques for Avoiding the Capture of CW Interference

Figure 12:
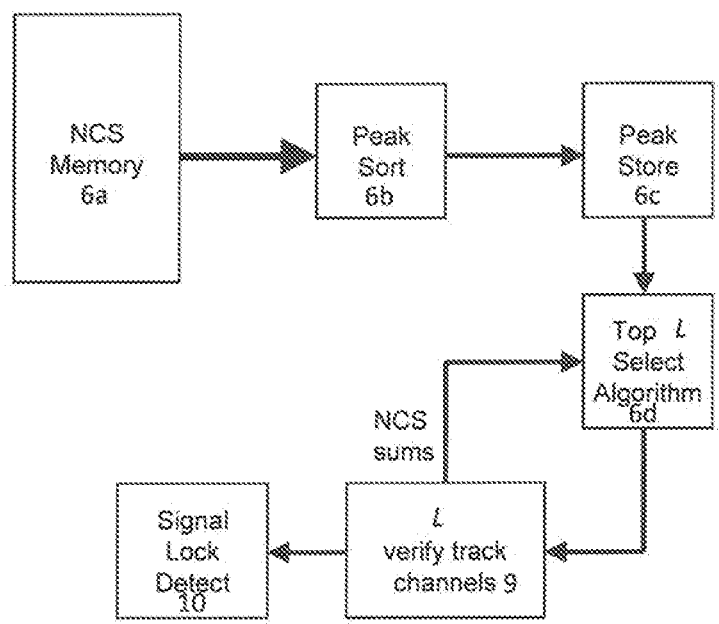
FIG. 12 is a schematic of a signal acquisition and verification system.

FIG. 12 shows a schematic diagram of how code phase offset candidates for a particular frequency and PN search bin may typically be passed from an acquisition engine to a verification engine and the correct offset verified and used for locking-on to a target satellite. As has been discussed previously (and as illustrated in FIG. 2) NCS integrator 6 maintains a table of the abs values ($s_{m,n}$) for each sample (n) as each correlation run (m) is performed. This may be stored in an NCS memory 6a. The abs values may then be passed to a peak sort section 6b where they are ordered by magnitude. The resulting ordered list may be kept in a peak store 6c. The list may then be passed to a top L select algorithm 6d which selects the highest L abs values ($s_{m,n}$) in the ordered list, where L is a predetermined integer. These are then passed to an L verify track channels section 9 for verification. In the meantime the next correlation run (m+1) takes place and its results undergo the same processing so that another list of L peaks are passed to the L verify track channels section 9. There the two lists undergo non-coherent summation such that abs values $s_{m+1,n}$ are added to corresponding abs values $s_{m,n}$ forming a third ordered list comprising greater than or equal to L values. This third list is passed back to the top L select algorithm 6d which selects the top L values and updates the list held in the L verify track channels section 9. This process is repeated until the list has been updated using the final ($M^{th}$) correlation run results. The final list will therefore only contain samples corresponding to code phases which have produced consistently high results. It can then be passed to signal lock detect section 10 so that the receiver can lock-on to the target satellite. This process is repeated for different search bins until enough satellites have been locked-on to for the receiver to be able to calculate its position.

Figure 13:
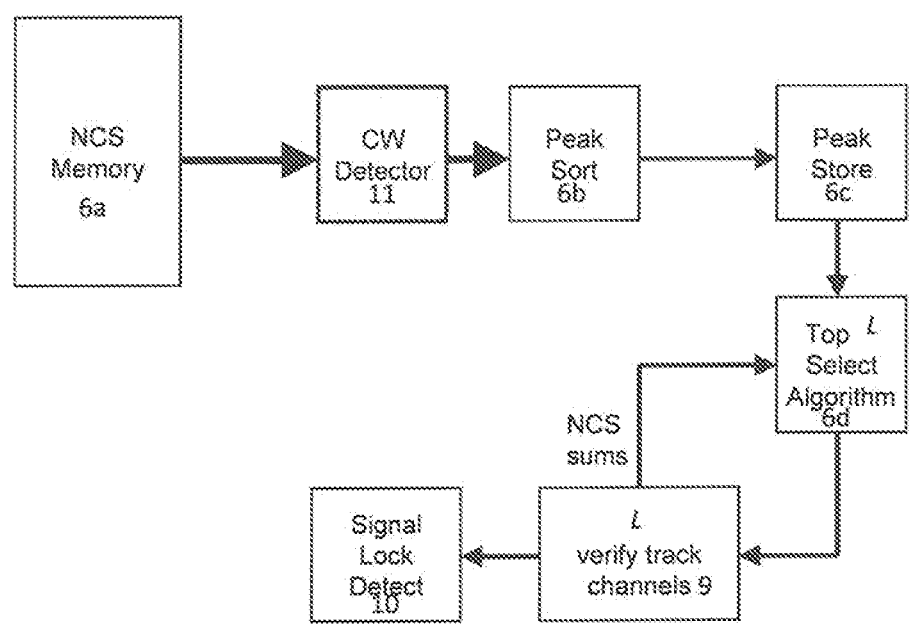
FIG. 13 is a schematic of a similar system with a CW detector.

The process of FIG. 12 will usually result in successful lock-on in the presence of Gaussian noise. However if CW interference is present then all L of the top peaks could be due to the interference. Therefore it would be advantageous to be able to detect search bins contaminated with CW interference. This could be done at any stage. A schematic diagram for an example system which includes a CW detector is shown in FIG. 13. It includes a CW detector 11 between the NCS memory 6a and the peak sort section 6b which does not allow a CW to be declared as one of the top L NCS peaks.

Figure 14:
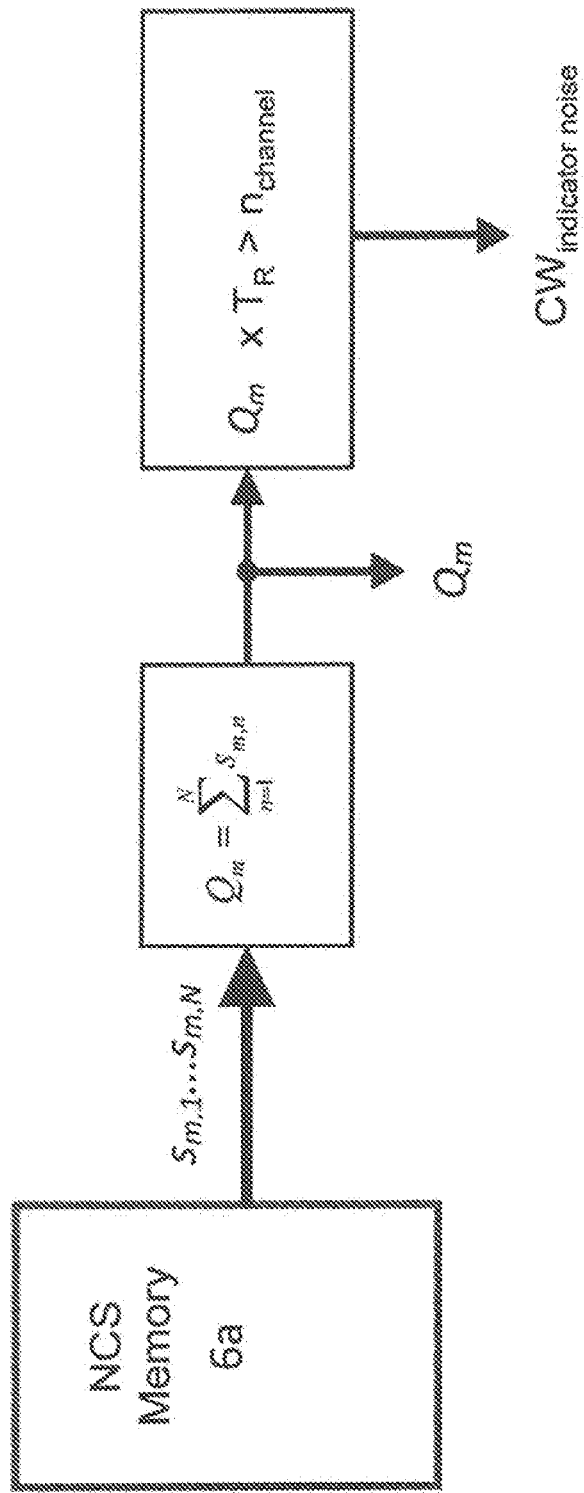
FIG. 14 shows how CW interference can be detected before signal detection.

FIG. 14 shows how a CW detector may function when used before signal detection. The abs values for the current correlation run (m) are all summed, giving a value $Q_m$. The CW detector output $CW_{indicator\ noise}$ is formed by comparing $Q_m$ and a noise channel ($n_{channel}$) via a threshold ($T_R$). A noise channel is typically formed in such a way as to avoid significant variations in its output due to small numbers of narrowband interferers. This is done by forming a noise channel as the sum of numerous and various (NCS summations) code phase and carrier frequency offsets such that any individual narrowband interferer will have limited impact on the noise channel output value. Therefore the noise channel does not vary with the introduction of a narrowband interferer but an acquisition channel (consisting of a single carrier frequency and multiple code phase hypotheses) will vary substantially if the narrowband interferer and the signal carrier frequency are close. Additionally a noise channel typically integrates noise power that varies with variation of AGC in the receiver. This is because the noise power is updated at regular intervals (e.g. every 20 msecs) and will vary with changing AGC across longer periods (e.g. 1 second). As long as the algorithm comparing $Q_m$ and noise channel is performed across substantially similar time periods they will be subject to the same AGC variation but their ratio will not.

Figure 15:
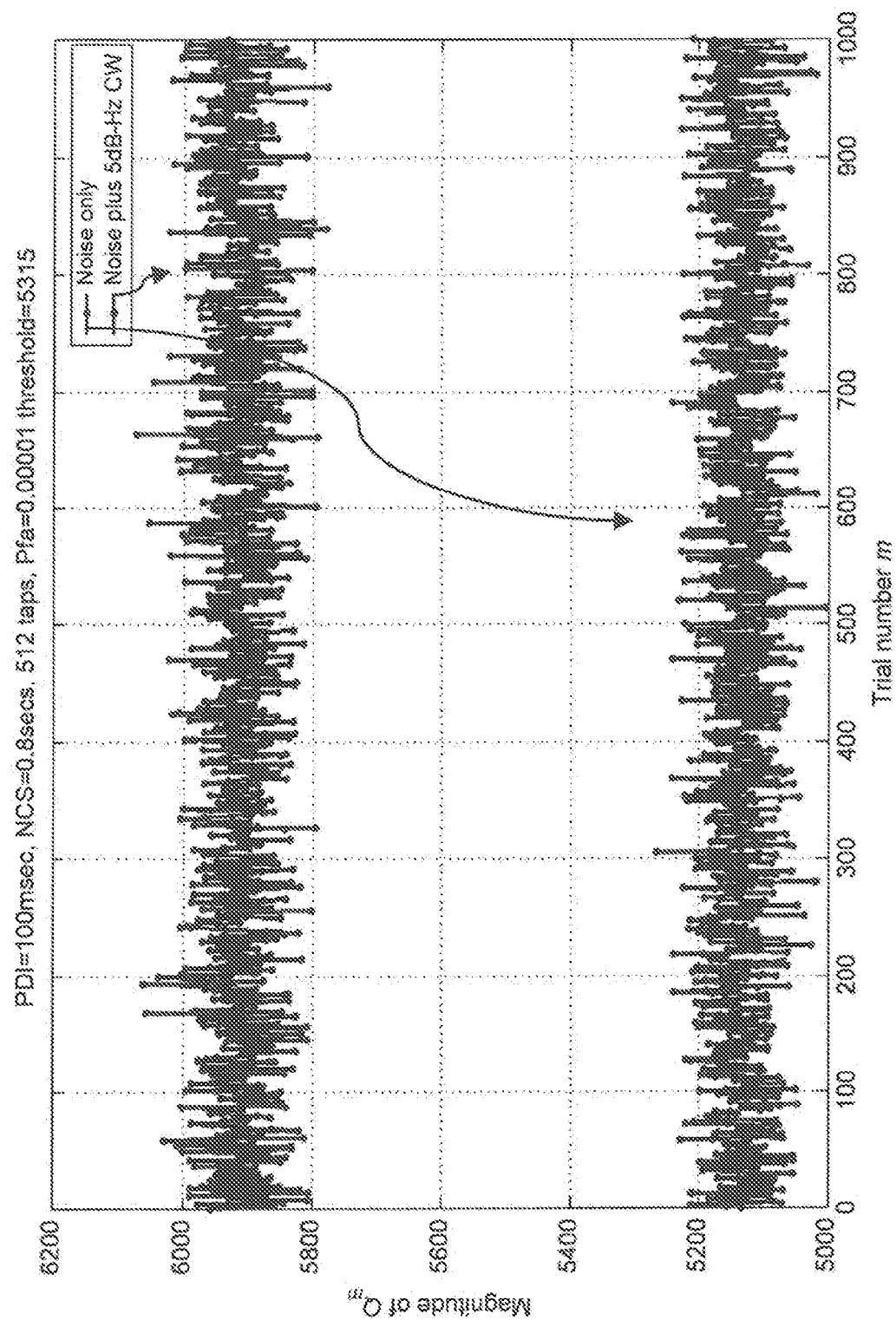
FIG. 15 plots a typical CW detector output.
Figure 16:
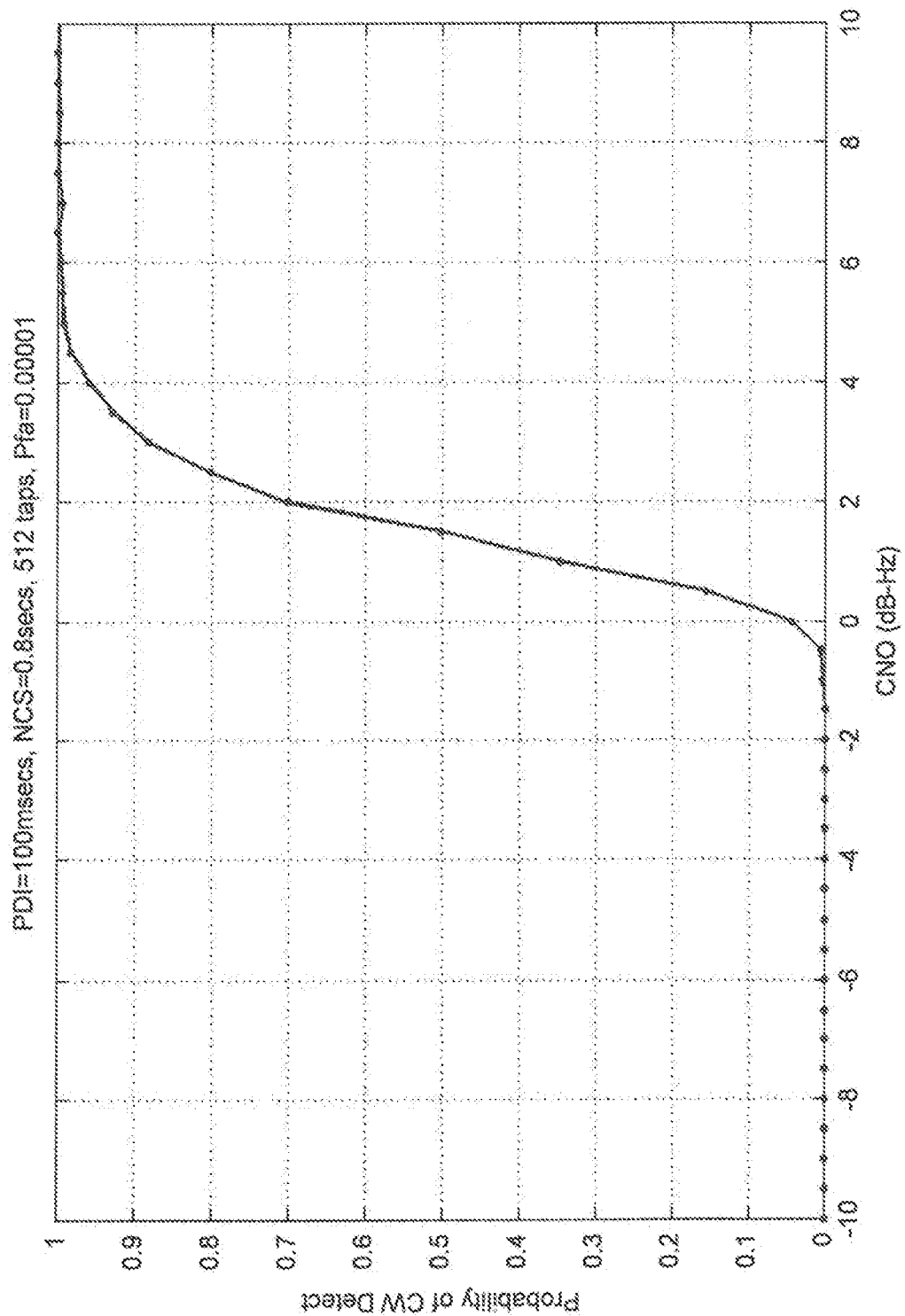
FIG. 16 plots the probability of CW detection against CNO.

FIG. 15 shows a typical output from the detector for a CW=5 dB-Hz. FIG. 16 shows the probability of CW detect performance for different carrier to noise ratios (CNOs). (PDI=pre-detection integral, i.e. coherent integration period, NCS=non-coherent summation time, Pfa=probability of false alarm.)

Figure 17:
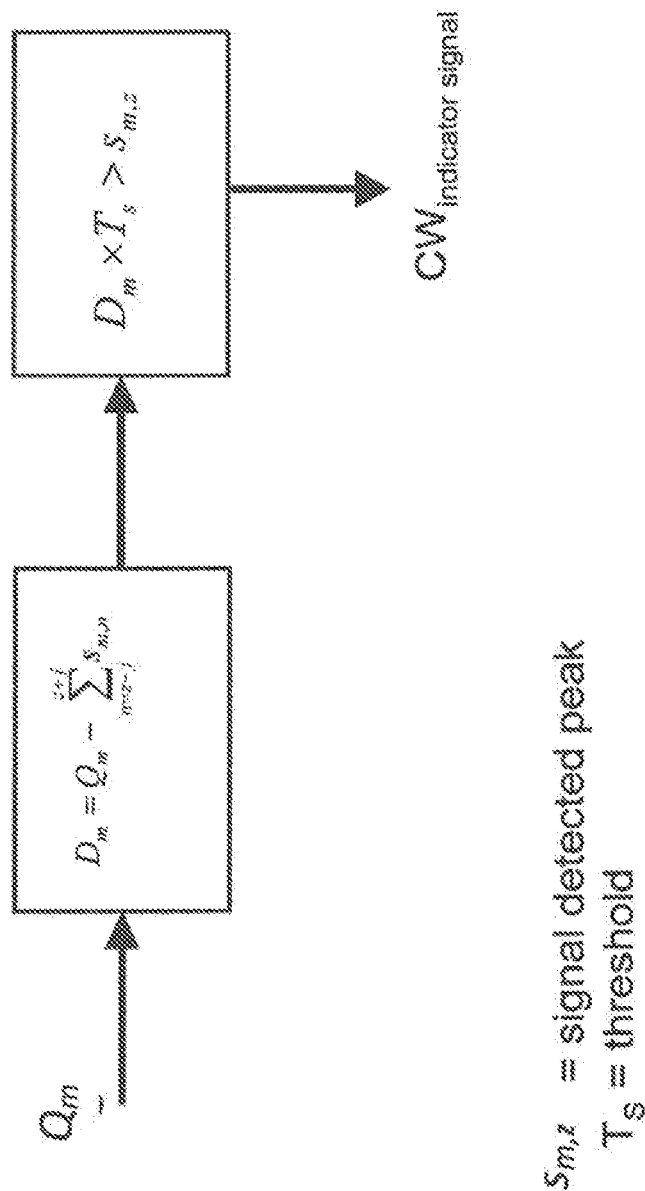
FIG. 17 shows how CW interference can be detected after signal detection.

FIG. 17 shows how a CW detector may function when used after signal detection. In this case the signal detect hypothesis code phase has n=z. A value D is calculated by subtracting from $Q_m$ the sum of the abs values for the samples surrounding sample z. D is then compared with sample z via a threshold $T_S$.

Figure 18:
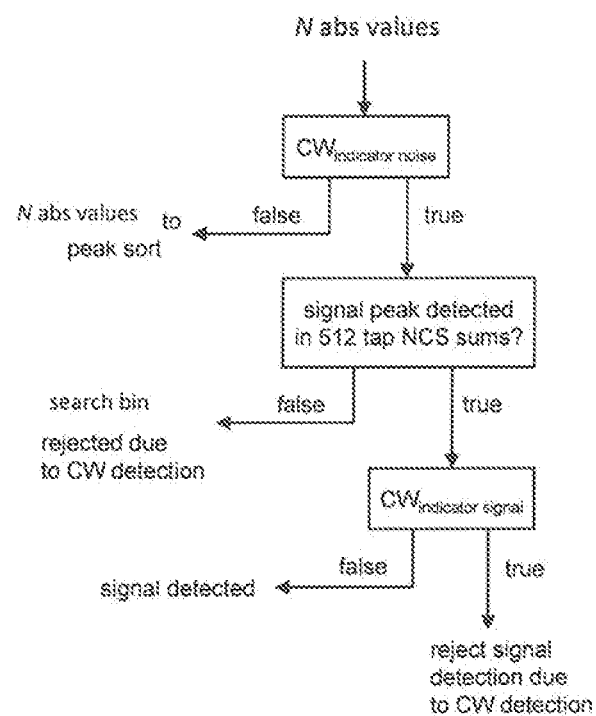
FIG. 18 is a flowchart of a signal detection process with CW detection.

FIG. 18 is a flow diagram of the detection process when both CW detections are performed. If a CW is not detected before signal detection then there is none present and the process can proceed as normal. If a CW is detected it is possible that it is a weak CW and there may also be a strong target signal present. Therefore a check is made for signal peaks. If no signal is detected then the search bin is rejected due to CW interference. If a signal is detected then the second kind of CW detection is performed. If this gives a true output then the search bin is rejected again, but if it gives a false output then a signal is detected.

CONCLUSIONS

A non-parametric method of detecting coherent interferers is preferable since it provides protection from unexpected and previously undetected interferers. It can avoid the requirement to obtain an adequate parametric representation of the cross-correlations they produce. This can mean that parametric data regarding newly launched satellites need not be collected. For example it might not be necessary to track Japan's new QZSS (Quasi-Zenith Satellite System) constellation of satellites. Additionally, signals may be suppressed before they are detected, reducing the processing load required to reject them.

Various modifications could be made to the method, for example the statistics measured need not be the mean and standard deviation of all the samples in the search bins. They could be any reasonable surrogates, including, for example, percentiles or the count of samples above or below some settable threshold. The NCS integrator could accumulate the squares of the sample values rather than their absolute values. The statistical signature determined may be calculated using any number of processing steps.

The method could be used in conjunction with traditional parametric techniques to improve accuracy.

Implementation does not necessarily have to be in GPS or a GNSS at all; other positioning systems, including terrestrial systems, could benefit from using the method disclosed. In fact it could be used in any system which needs to detect coherent interference for the purpose of locking-on to a specific signal to the exclusion of coherent interference signals, or for any other reason.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for detecting coherent interference, the method comprising the steps of:
   (a) receiving a signal at a first frequency,
   (b) forming a set of cross-correlation results by at least cross-correlating the signal with a first known code for a plurality of code offsets,
   (c) determining a first statistical signature of the cross-correlation results, and
   (d) deciding, based on the first statistical signature, whether non-negligible coherent interference is present within a first search bin defined by the combination of the first frequency and the first known code,
   wherein the step (d) comprises comparing the statistical signature with a first expected statistical signature, and
   (e) assessing whether the first expected and measured statistical signatures deviate by less than a first predetermined amount and if they do then determining that there is negligible coherent interference in the first search bin.

2. A method as claimed in claim 1, wherein the said step (b) of forming the set of cross-correlation results comprises at least: (b.i) cross-correlating the signal with a first known code for a plurality of code offsets, and (b.ii) either: (b.ii.1) determining the absolute values of the values output by the said step (b.i), or (b.ii.2) determining the squares of the values output by the said step (b.i).

3. A method as claimed in claim 2, wherein the said step (b) of forming the set of cross-correlation results further comprises at least: (b.iii) non-coherently summing all the values determined in the said step (b.ii) each time a new value is determined by the said step (b.ii).

4. A method as claimed in claim 1, wherein the first known code is a pseudorandom code.

5. A method as claimed in claim 1 wherein the first statistical signature indicates the extent to which peak values among the cross-correlation results are clustered about plural code offsets.

6. A method as claimed in claim 2, comprising the step of: comparing the values determined in the said step (b.ii.1) to a threshold value, and determining any code offsets having cross-correlation results higher than that threshold value to be candidates for future receiving operations.

7. A method as claimed in claim 6, comprising the step of calculating the threshold value as the mean of the values determined in the said step (b.ii.1) plus a multiple of their standard deviation.

8. A method as claimed in claim 6, comprising re-calculating the threshold value from time to time.

9. A method as claimed in claim 6, wherein the method comprises assessing whether the number of candidates exceeds a predetermined value, and if it does determining there to be non-negligible coherent interference present in the first search bin.

10. A method for detecting coherent interference, the method comprising the steps of:
   (a) receiving a signal at a first frequency, (b) forming a set of cross-correlation results by at least cross-correlating the signal with a first known code for a plurality of code offsets, (c) determining a first statistical signature of the cross-correlation results, and (d) deciding, based on the first statistical signature, whether non-negligible coherent interference is present within a first search bin defined by the combination of the first frequency and the first known code, wherein the said step (d) comprises comparing the first statistical signature with a first expected statistical signature, and (e) assessing whether the first expected and measured statistical signatures deviate by more than a second predetermined amount and if they do then determining that there is non-negligible coherent interference present in the first search bin.

11. A method as claimed in claim 10, wherein the first expected statistical signature is the statistical signature expected in the absence of non-negligible coherent interference.

12. A method as claimed in claim 10, wherein the first expected statistical signature is that of additive white Gaussian noise.

13. A method as claimed in claim 10, wherein the coherent interference is continuous wave interference and the first expected statistical signature is that of a noise channel.

14. A method as claimed in claim 1, wherein the said step (d) comprises treating the received signal as having a constant variance.

15. A method as claimed in claim 10, wherein the method comprises assessing whether the first expected and measured statistical signatures deviate by an amount between a first predetermined amount and said second predetermined amount, and if they do then in the said step (d) repeating the previous steps with an increased threshold value.

16. A method as claimed in claim 15, comprising re-calculating the first and/or second amounts from time to time.

17. A method as claimed in claim 1, wherein the first statistical signature is the standard deviation of the cross-correlation results.

18. A method as claimed in claim 1, wherein the method is performed for a plurality of search bins.

19. A method as claimed in claim 1, wherein the known code is a code transmitted by a particular remote transmitter.

20. A method as claimed in claim 1, wherein the method is performed as part of a signal acquisition process.

21. A method as claimed in claim 1, wherein the received signal originates from a satellite.

22. A method as claimed in claim 13, further comprising the steps of: if the said step (d) resulted in a decision that coherent interference was present within the first search bin then (e.i) repeating the previous steps for a second search bin, different to the first search bin; or if the said step (d) resulted in a decision that coherent interference was not present within the first search bin then (e.ii) determining a second statistical signature of the cross-correlation results, and deciding, based on the second statistical signature, whether non-negligible coherent interference is present within the first search bin.

23. A system for detecting coherent interference, the system comprising:

a signal receiver for receiving a signal at a first frequency, a cross-correlator for forming a set of cross-correlation results by at least cross-correlating the received signal with a first known code for a plurality of code offsets, a processor for determining a first statistical signature of the cross-correlation results, and a decision unit for deciding whether non-negligible coherent interference is present within a first search bin defined by the combination of the particular frequency and the first known code based on the statistical signature, by comparing the first statistical signature with a first expected statistical signature, and assessing whether the first expected and measured statistical signatures deviate by more than a second predetermined amount and if they do then determining that there is non-negligible coherent interference present in the first search bin.

* * * * *